United States Patent
Han et al.

(10) Patent No.: US 10,798,605 B2
(45) Date of Patent: Oct. 6, 2020

(54) MESSAGE TRANSMISSION METHOD AND APPARATUS

(71) Applicant: Huawei Technologies Co., Ltd., Shenzhen (CN)

(72) Inventors: Guanglin Han, Munich (DE); Xiaolong Guo, Beijing (CN); Xin Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 86 days.

(21) Appl. No.: 15/447,970

(22) Filed: Mar. 2, 2017

(65) Prior Publication Data

US 2017/0181030 A1    Jun. 22, 2017

Related U.S. Application Data

(63) Continuation of application No. PCT/CN2014/085782, filed on Sep. 2, 2014.

(51) Int. Cl.
*H04W 28/02* (2009.01)
*H04L 12/24* (2006.01)
(Continued)

(52) U.S. Cl.
CPC ......... *H04W 28/0289* (2013.01); *H04L 41/00* (2013.01); *H04L 43/0882* (2013.01); *H04L 47/10* (2013.01); *H04W 52/38* (2013.01)

(58) Field of Classification Search
CPC ..... H04B 7/204; H04L 12/26; H04L 43/0882; H04W 4/00; H04W 28/02; H04W 36/00;
(Continued)

(56) References Cited

U.S. PATENT DOCUMENTS 5,732,077 A * 3/1998 Whitehead .......... H04W 52/286
                                                      370/349
8,089,971 B1    1/2012 Kunz et al.
(Continued)

FOREIGN PATENT DOCUMENTS

CN          1416659 A       5/2003
CN        101087244 A      12/2007
(Continued)

OTHER PUBLICATIONS

Huang et al., "Modeling and Analysis on Congestion Control in the Internet of Things," IEEE ICC 2014-Ad-hoc and Sensor Networking Symposium, pp. 434-439, XP-32632193, Institute of Electrical and Electronics Engineers, New York, New York (2014).
(Continued)

*Primary Examiner* — Zhiren Qin
(74) *Attorney, Agent, or Firm* — Leydig, Voit & Mayer, Ltd.

(57) ABSTRACT

A terminal obtains network congestion control configuration information. The terminal processes a message generated by the terminal according to the network congestion control configuration information and obtains the processed message. Then the terminal sends the processed message. Therefore, the message generated by the terminal can be processed flexibly to relieve a network congestion problem in the Internet of vehicles.

12 Claims, 8 Drawing Sheets

---

201. A terminal obtains network congestion control configuration information

↓

202. The terminal processes, according to the network congestion control configuration information, a message generated by the terminal, and obtains the processed message

↓

203. The terminal sends the processed message

(51) Int. Cl.
*H04L 12/801* (2013.01)
*H04L 12/26* (2006.01)
*H04W 52/38* (2009.01)

(58) Field of Classification Search
CPC ... H04W 52/38; H04W 52/286; H04W 60/04; H04W 28/0289
USPC .................................. 370/338, 349; 455/438
See application file for complete search history.

(56) References Cited

U.S. PATENT DOCUMENTS

| | | | | |
|---|---|---|---|---|
| 8,326,306 | B2* | 12/2012 | Zhao | H04W 60/04 |
| | | | | 370/338 |
| 2003/0031203 | A1 | 2/2003 | Fukui | |
| 2006/0276191 | A1* | 12/2006 | Hwang | H04W 36/30 |
| | | | | 455/436 |
| 2008/0219169 | A1* | 9/2008 | Sargor | H04L 43/026 |
| | | | | 370/238 |
| 2009/0092120 | A1* | 4/2009 | Goto | H04W 28/22 |
| | | | | 370/345 |
| 2009/0232001 | A1 | 9/2009 | Gong et al. | |
| 2010/0135215 | A1* | 6/2010 | Tang | H04L 5/0044 |
| | | | | 370/328 |
| 2012/0184321 | A1* | 7/2012 | Baldessari | C09D 5/08 |
| | | | | 455/522 |
| 2013/0121147 | A1 | 5/2013 | Tapia et al. | |
| 2013/0244715 | A1* | 9/2013 | Kwon | H04W 52/242 |
| | | | | 455/522 |
| 2014/0153390 | A1* | 6/2014 | Ishii | H04W 52/383 |
| | | | | 370/230 |
| 2014/0321313 | A1* | 10/2014 | Seo | H04J 11/0056 |
| | | | | 370/252 |
| 2015/0087351 | A1* | 3/2015 | Majjigi | H04W 52/52 |
| | | | | 455/522 |
| 2015/0270925 | A1* | 9/2015 | Lin | H04L 1/0003 |
| | | | | 370/329 |
| 2015/0295676 | A1* | 10/2015 | Kenney | H04L 5/0023 |
| | | | | 370/330 |
| 2015/0296411 | A1* | 10/2015 | Meyer | G08G 1/0112 |
| | | | | 370/336 |
| 2016/0028569 | A1* | 1/2016 | Li | H04L 47/12 |
| | | | | 370/237 |
| 2016/0249243 | A1* | 8/2016 | Kim | H04W 24/08 |
| 2017/0093474 | A1* | 3/2017 | Lee | H04B 7/0632 |
| 2018/0270730 | A1* | 9/2018 | Martin | H04W 24/10 |
| 2019/0306908 | A1* | 10/2019 | Hahn | H04W 76/19 |

FOREIGN PATENT DOCUMENTS

| | | |
|---|---|---|
| CN | 101577938 A | 11/2009 |
| CN | 101742555 A | 6/2010 |
| CN | 102104908 A | 6/2011 |
| CN | 102223675 A | 10/2011 |
| CN | 102255790 A | 11/2011 |
| WO | WO 2014072991 A1 | 5/2014 |

OTHER PUBLICATIONS

Hartenstein et al.,"VANET: Vehicular Applications and Inter-Networking Technologies," John Wiley & Sons, Ltd., West Sussex, United Kingdom (2010).

\* cited by examiner

MESSAGE TRANSMISSION METHOD AND APPARATUS

CROSS-REFERENCE TO RELATED APPLICATIONS

This application is a continuation of International Application No. PCT/CN2014/085782, filed on Sep. 2, 2014, the disclosure of which is hereby incorporated by reference in its entirety.

TECHNICAL FIELD

Embodiments of the present invention relate to the field of communications technologies, and in particular, to a message transmission method and apparatus in an environment of the Internet of vehicles.

BACKGROUND

With emergence of the technology of the Internet of vehicles, a new idea of reducing a road accident probability is put forward. Based on the technology of the Internet of vehicles, a vehicle terminal on a vehicle can send state information of the vehicle, and can receive state information of other vehicles. A driver can evaluate road conditions in advance according to the information, so as to reduce the accident probability.

The Internet of vehicles includes a terminal (User Equipment, UE), and the terminal is mounted in a vehicle. The terminal mentioned below may be a vehicle terminal, or may be a general terminal. Depending on a network architecture of the Internet of vehicles, the network may further include a network device. The network device may be a base station, an evolved NodeB, a micro base station, or the like. The network device provides services for terminals in coverage. FIG. 1 shows a network architecture of the Internet of vehicles. Vehicles in the figure are vehicles in which terminals are mounted. From FIG. 1, it can be seen that in the Internet of vehicles, a vehicle 1 and a vehicle 2 may be scheduled by the network device; and a vehicle 3 cannot receive scheduling control of the network device because the vehicle 3 is not in the coverage of the network device. No matter whether the vehicles can receive scheduling control of the network device or not, messages can be sent between the vehicle 1, the vehicle 2, and the vehicle 3 to implement information exchange and increase driving safety.

With an increasing growth of vehicles equipped with terminals compatible with the Internet of vehicles on roads, a network congestion problem of the Internet of vehicles emerges. In addition, with continuous enhancement of functions of the terminal of the Internet of vehicles, the terminal can generate more vehicle state messages that are more detailed and ready for sending. The existing terminal sends generated messages without control. This exacerbates the network congestion problem of the Internet of vehicles.

SUMMARY

To resolve the problem that exists in the prior art, embodiments of the present invention provide a message transmission method and apparatus.

According to a first aspect, a message transmission method is provided in an embodiment of the present invention. The method includes: obtaining, by a terminal, network congestion control configuration information; processing, by the terminal according to the network congestion control configuration information, a message generated by the terminal, and obtaining the processed message; and sending, by the terminal, the processed message.

According to another aspect, a message transmission apparatus is provided in an embodiment of the present invention. The apparatus includes an obtaining module, configured to obtain network congestion control configuration information; a processing module, configured to: process, according to the network congestion control configuration information, a message generated by a terminal, and output the processed message; and a sending module, configured to send the processed message.

According to another aspect, a message transmission method is provided in an embodiment of the present invention. The method includes: determining, by a network device, network congestion control configuration information; and sending, by the network device, the network congestion control configuration information to a terminal, where the network control configuration information is used by the terminal to process, according to the network control configuration information, a message generated by the terminal.

According to another aspect, a message transmission apparatus is provided in an embodiment of the present invention. The apparatus includes an obtaining module, configured to obtain network congestion control configuration information; a processing module, configured to: process, according to the network congestion control configuration information, a message generated by a terminal, and obtain the processed message; and a sending module, configured to send the processed message.

The embodiments of the present invention provide a technical solution for processing, according to network congestion control configuration information, a message generated by a terminal. Based on the technical solution, the terminal can flexibly process a message generated by the terminal. In an application environment of the Internet of vehicles, the technical solution in which the embodiments of the present invention are applied can relieve a network congestion problem.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
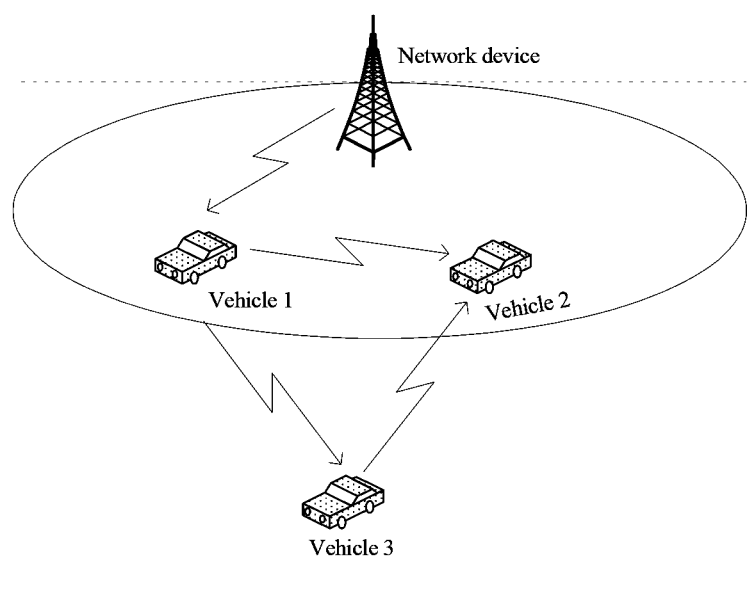
FIG. 1 is a schematic diagram of an architecture of the Internet of vehicles.
Figure 2:
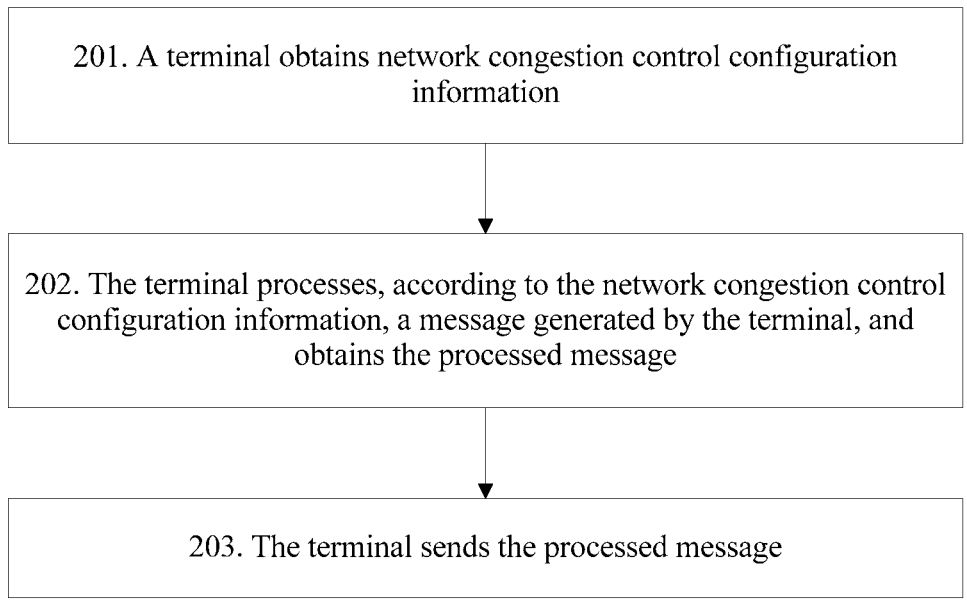
FIG. 2 is a flowchart of a message transmission method according to an embodiment of the present invention.

FIG. 2 is a flowchart of a message transmission method according to this embodiment. The method shown in FIG. 2 may be executed by a vehicle terminal, or may be executed by a general terminal. The method includes the following steps.

Step 201: A terminal obtains network congestion control configuration information.

The network congestion control configuration information may include at least one or a combination of the following information: information about a time interval of sending a message, information about a period of sending a message, information about a frequency of sending a message, information about power control for sending a message, information about content control for sending a message, or information about rate control for sending a message. The network congestion control configuration information may further include other information determined according to a network congestion status of a network. This is not limited in this embodiment of the present invention.

In a specific implementation process, each type of network congestion control configuration information may include more specific information. For example, the information about a time interval of sending a message includes one or a combination of: information about a minimum time interval of sending a message, information about a maximum time interval, or information about a reference time interval.

The information about a period of sending a message includes one or a combination of: information about a maximum period of sending a message, information about a minimum period, or information about a reference period.

The information about a frequency of sending a message includes one or a combination of: information about a maximum frequency of sending a message, information about a minimum frequency, or information about a reference frequency. The frequency mentioned herein does not refer to a carrier frequency, but refers to a frequency corresponding to a quantity of times of sending a message per unit time.

The information about power control for sending a message includes one or a combination of: information about a maximum transmit power for sending a message, information about a minimum transmit power, or information about a reference transmit power; or the information about power control for sending a message includes one or a combination of: a reference transmit power parameter for sending a message, a path loss power compensation parameter, a movement speed power compensation parameter, or a format power compensation parameter; or the information about power control for sending a message includes one or a combination of: information about a reference distance of sending a message, information about a maximum distance, or information about a minimum distance.

The information about content control for sending a message includes one or a combination of: information about a maximum length of sending a message, control information about a maximum quantity of physical resources occupied for sending a message, or content selection information for sending a message.

The information about rate control for sending a message includes one or a combination of: information about a highest rate of sending a message, or information about a lowest rate.

In a specific process of implementing step 201, a method for obtaining, by the terminal, the network congestion control configuration information includes at least one of the following:

the terminal obtains the network congestion control configuration information according to preconfigured information;

the terminal obtains the network congestion control configuration information according to a message sent by a network device; and the terminal measures a channel load status of an environment in which the terminal is located, and obtains the network congestion control configuration information according to the channel load status.

A method for obtaining, by the terminal, the network congestion control configuration information according to the message sent by the network device may include one or more of the following:

the terminal determines the network congestion control configuration information according to dedicated signaling sent by the network device;

the terminal determines the network congestion control configuration information according to packet control signaling sent by the network device; or the terminal determines the network congestion control configuration information according to a broadcast message sent by the network device.

In a specific process of implementing step 201, the method for obtaining, by the terminal, the network congestion control configuration information may further include: the terminal obtains a network congestion level indication, and the terminal determines the network congestion control information according to the network congestion level indication. In a specific implementation process, there are multiple methods for obtaining, by the terminal, the network congestion level indication. For example, the terminal may obtain the network congestion level indication according to preconfigured information or according to a message sent by the network device, or the network device measures a channel load status of an environment in which the terminal is located, so as to obtain the network congestion level indication.

Step 202: The terminal processes, according to the network congestion control configuration information, a message generated by the terminal, and obtains the processed message.

The message generated by the terminal may be specifically a message generated by an upper-layer entity of the terminal. The terminal configures a message sending entity of the terminal according to the network congestion control configuration information, and the message sending entity processes the message from the upper-layer entity.

In the terminal, an entity that provides a to-be-sent message for the message sending entity is an upper-layer entity of the message sending entity. The message sending entity of the terminal may be specifically a logical channel entity, a message queue entity, or a media access entity. When the message sending entity is specifically a logical channel entity, the upper-layer entity of the message sending entity may be an application program that is used to generate vehicle state information. When the message sending entity is specifically a media access entity, the upper-layer entity of the message sending entity may be a logical channel entity or a message queue entity. The message sending entity may also be a message queue entity that is used to combine received upper-layer messages into a message queue, so as to process data of the message queue. The message queue entity is similar to the logical channel entity.

In a terminal, there may be more than one message sending entity. For example, when the message sending entity is a logical channel entity, a logical channel entity may be set for each message type. Specifically, a logical channel entity may be established for a vehicle coordination message, and another logical channel entity may be established for an event message related to a vehicle environment. The same logic may be further applicable to a case in which the message sending entity is a message queue entity or a media access entity.

Corresponding to multiple possible message sending entities in a terminal, network congestion control configuration information configured for each message sending entity may differ.

In a specific implementation process, the terminal may process, according to the network congestion control configuration information, all messages generated by the terminal.

Step 203: The terminal sends the processed message.

In a specific implementation process, in a scenario in which resources are not scheduled centrally, the terminal monitors channels, initiates resource contention on an idle channel, and after obtaining a sending resource, sends the message by using the sending resource.

In a specific implementation process, in a scenario in which resources are scheduled centrally, the terminal obtains a sending resource for the processed message, and the sending resource is used to send the message. If the terminal obtains the sending resource required for sending the message, the terminal sends the message by using the sending resource.

In a specific implementation process, the method in this embodiment may further include step 204: The terminal sends congestion status information to the network device, where the congestion status information is used to assist the network to generate the network congestion control configuration information or the network congestion level indication.

A condition for triggering the terminal to send the congestion status information to the network device may include at least one of the following:

the terminal sends the congestion status information to the network device if the terminal starts to request the required sending resource for the message and still does not obtain the sending resource when a first time point arrives;

the terminal sends the congestion status information to the network device if the terminal still does not obtain the sending resource from a time point of obtaining the message to a second time point;

the terminal sends the congestion status information to the network device if the terminal starts to request the sending resource for the message and still does not obtain the sending resource when a quantity of times of initiating a resource request exceeds a first threshold; or the terminal sends the congestion status information to the network device if the terminal still does not obtain the sending resource from a time point of obtaining the message until a quantity of discarded messages exceeds a second threshold.

The first time point, the second time point, the first threshold, and the second threshold may come from the preconfigured information of the terminal, or may be obtained according to the message from the network device. This is not limited in the present invention.

The congestion status information includes at least one of the following:

a time length during which the terminal determines that the required sending resource is not obtained; or a quantity of resource requesting times during which the terminal determines that the required sending resource is not obtained.

In the present invention, the terminal sends the message in one of the following manners:

sending the message to another terminal by using a wireless interface between the terminals, where the terminal obtains an interface transmission resource between terminal devices, and sends the message to another terminal on the obtained transmission resource, for example, a vehicle terminal obtains a vehicle to vehicle (V2V, vehicle to vehicle) interface transmission resource, and the vehicle terminal sends a V2V message to another vehicle terminal on the obtained transmission resource; or sending the message to a network device by using a wireless interface between the terminal and the network device, where the terminal obtains an interface transmission resource between the terminal device and the network device, and sends the message to the network device on the obtained transmission resource.

According to the method in this embodiment of the present invention, the terminal obtains the network congestion control configuration information, processes, according to the network congestion control configuration information, the message generated by the terminal, and obtains the processed message, and then the terminal sends the processed message. According to the method in this embodiment of the present invention, the terminal can flexibly process, according to the network congestion control configuration information, a message generated by the terminal. In an application environment of the Internet of vehicles, the method in this embodiment of the present invention can be used to relieve a network congestion problem.

Embodiment 2

Figure 3:
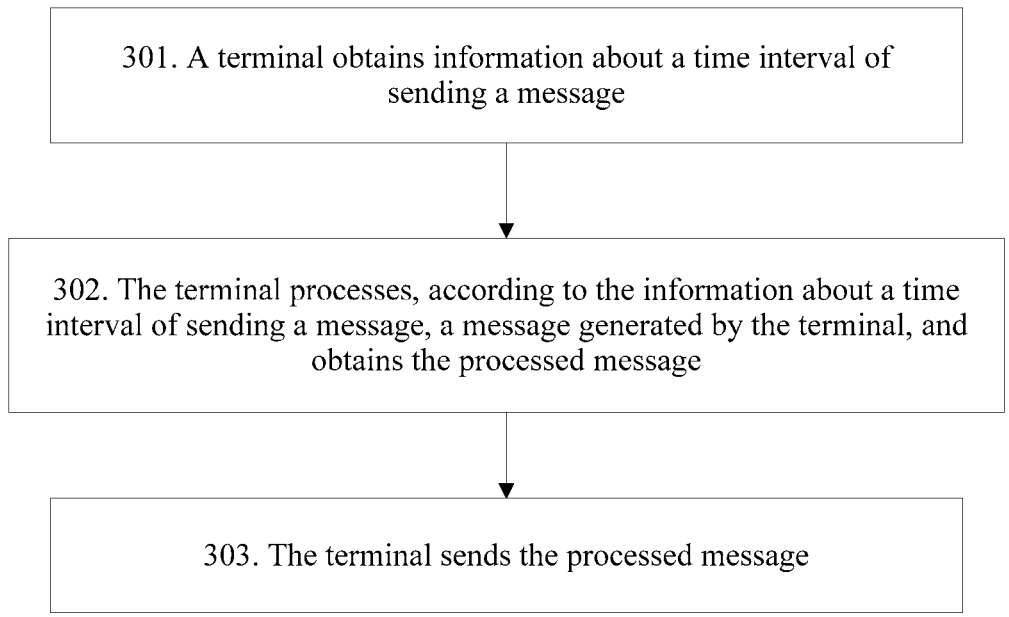
FIG. 3 is a flowchart of a message transmission method according to an embodiment of the present invention.

FIG. 3 shows an information transmission method according to this embodiment. In the method provided in this embodiment, network congestion control configuration information includes information about a time interval of sending a message. The method includes the following specific implementation steps.

Step 301: A terminal obtains information about a time interval of sending a message.

The information about a time interval of sending a message may include one or a combination of: information about a maximum time interval of sending a message, information about a minimum time interval of sending a message, or information about a reference time interval of sending a message.

In a specific implementation process, the terminal may obtain different types of information about a time interval to configure multiple message sending entities that may exist in the terminal. For example, the terminal obtains first information about a maximum time interval to configure a first message sending entity of the terminal, obtains second information about a maximum time interval to configure a second message sending entity, and obtains third information about a minimum time interval to configure a third message sending entity. In this way, the terminal can process the message more flexibly.

In a specific process of implementing step 301, a method for obtaining, by the terminal, the network congestion control configuration information may include one of the following:

(1) The terminal obtains, according to preconfigured information, the information about a time interval of sending information.

The preconfigured information may be information that is preconfigured in the terminal before the terminal is delivered from a factory, and before performing communication, the terminal obtains the network congestion control configuration information according to the information that is preconfigured in the terminal. The preconfigured information may also be network congestion control configuration information that is configured by a network and stored in the terminal, and before performing communication, the terminal uses the history network congestion control configuration information as the network congestion control configuration information for current communication. In this way, the terminal can work normally no matter whether a network device service is available, and an application scope of the terminal is wider.

(2) The terminal determines, according to a message sent by the network device, the information about a time interval of sending information.

In a specific implementation process, there are multiple methods for determining, by the terminal, the network congestion control configuration information according to the message sent by the network device, and the methods include but are not limited to:

The terminal receives dedicated signaling sent by the network device, and determines the network congestion control configuration information according to the dedicated signaling. Specifically, in a unicast scenario, a connection is established between the terminal and the network device. The network device sends a message to the terminal, and the terminal may determine the network congestion control configuration information according to the message sent by the network device. The dedicated signaling (English: Dedicated Signal) refers to signaling sent by the network device when point-to-point communication is performed between the terminal and the network device. In this way, the network device may perform well-targeted and more flexible configuration according to types of vehicles. For example, for some special vehicles, looser network congestion control configuration options may be provided, for example, for vehicles such as an ambulance and a fire engine, the network device may allow a vehicle terminal to send a message at shorter time intervals, or send a message at a higher power, or the like.

The terminal receives a message sent by the network device to a group in which the terminal is located, and determines the network congestion control configuration information according to the message. Specifically, in a multicast scenario, the terminal obtains a group identifier by means of preconfiguration, or obtains a group identifier from the network device, determines the group in which the terminal is located, and then monitors the message sent by the network to the group, so as to determine the network congestion configuration information.

The terminal obtains the network congestion control configuration information according to a message that is broadcast by the network device. In a broadcast scenario, the network device broadcasts a terminal communication configuration parameter in a coverage area. Before performing communication, the terminal receives broadcast information from the network device, and determines the network congestion control configuration information according to the broadcast information. Specifically, the network device adds, to the broadcast information, a special system information block (System Information Block) that is to be broadcast to the terminal, for example, a system information block that is sent to a terminal applied in the Internet of vehicles may be a vehicle direct communication system information block Vehicle Direct Communication Block (VDC-SIB), or a vehicle safety communication system information block Vehicle Safety Communication System Information Block (VSC-SIB), and the system information block includes the network congestion control configuration information. In this way, the network device may determine the broadcast information according to a network status of an area in which the network device is located. For example, if the network device detects, by means of monitoring, that few vehicles are in the coverage, the network device allows the terminal to send a message by using looser network congestion status control configuration options; or if the network device detects, by means of monitoring, that network congestion in the coverage is relatively severe, the network device tightens the network congestion control options for the terminal, for example, requires the terminal to send a message at a lower power or at longer transmission time intervals. In this way, the terminal can obtain network congestion control configuration information related to a real-time road status, and the network device does not need to establish a connection to each terminal, thereby simplifying network device design.

In a specific implementation process, the terminal may receive a time interval message sent by the network device, and the time interval message includes information about a time interval.

(3) The terminal measures a channel load status of an environment in which the terminal is located, and according to the channel load status, determines and obtains the information about a time interval of sending information.

A specific implementation manner may include: measuring a received data volume within a specified time range. If the received data volume is relatively large, it indicates that channel load is relatively high.

Alternatively, wireless signal intensity of a channel within a specified time range may be measured. If the wireless signal intensity is relatively high, it indicates that another terminal occupies the channel, and signal interference occurs when the terminal sends data currently. Therefore, it is determined that wireless channel load is relatively high.

Alternatively, a transmission rate of a wireless channel may be measured, that is, a rate of data received per unit time. If the rate of the received data is relatively high, it is determined that channel load is relatively high.

Alternatively, duration of the load status may be measured, for example, a time length that signal strength of a channel lasts, or a time length that a receiving rate lasts. Alternatively, a channel occupation time may be measured, that is, a time length of occupying a wireless channel by another terminal for sending data. Alternatively, a channel busy time may be measured, for example, if a channel occupation time exceeds a threshold in a unit measurement time, it is considered that the channel is busy. The channel busy time refers to a time length that the state lasts.

The terminal may determine the network congestion control configuration information according to a channel load status. In this way, the terminal can obtain the network congestion control configuration information without depending on the network device, and this method is more flexible than the method of determining the configuration information according to the message from the network device. The terminal determines the configuration information according to a wireless status of the environment in which the terminal is located, and the configuration information is more precise than the configuration information obtained in a preconfigured manner. In addition, the terminal may send the measured channel load status to the network device, so that the network device determines a network congestion status according to the channel load status, and determines the network congestion control configuration information or a network congestion indication that is configured for the terminal.

(4) In a specific process of implementing step 301, the method for obtaining, by the terminal, the network congestion control configuration information may further include: obtaining, by the terminal, a network congestion level indication, and determining the network congestion control information according to the network congestion level indication.

In a specific implementation process, there are multiple methods for obtaining, by the terminal, the network congestion level indication: The terminal receives a network congestion level indication message sent by the network device, or the network device measures a channel load status of an environment in which the terminal is located, so as to obtain the network congestion level indication.

The network congestion level indication may be quantized according to a network congestion extent, and the corresponding information about a time interval of sending information may be determined according to the network congestion level indication. For example, according to the network congestion extent, the network congestion level indication is classified into: high load, medium load, and low load, and the corresponding information about a time interval may be set to: 100 ms, 10 ms, and 1 ms respectively.

In this way, when the network congestion level is determined according to a message from the network device, a quantity of messages transmitted by the network device may be reduced. When the method of measuring the channel load status of the environment in which the terminal is located is used, the network congestion control configuration information may be set flexibly.

Step 302: The terminal processes, according to the information about a time interval of sending a message, a message generated by the terminal.

The terminal configures a message sending entity of the terminal according to the information about a time interval of sending a message, and the message sending entity processes a message from an upper-layer entity. As described in Embodiment 1, the message sending entity may be a logical channel entity, a message queue entity, or a media access entity. The information about a time interval of sending a message may include one or a combination of: information about a maximum time interval, information about a minimum time interval, or information about a reference time interval. A specific solution for the terminal to process the message is described below.

(1) A solution in which the information about a time interval of sending a message includes the information about a reference time interval:

If the message sending entity is a logical channel entity, the logical channel entity receives a message from the upper-layer entity at configured time intervals according to the information about a reference time interval.

If the message sending entity is a media access entity, the media access entity sends messages from a corresponding logical channel entity at configured time intervals according to the information about a reference time interval.

(2) A solution in which the information about a time interval of sending a message includes the information about a maximum time interval:

If the message sending entity is a logical channel entity, the logical channel entity receives a message from the upper-layer entity at time intervals that are not greater than the maximum time interval.

If the message sending entity is a media access entity, the media access entity sends messages from a logical channel entity at time intervals that are not greater than the maximum time interval.

In this way, transmission quality is ensured for important messages to ensure quality of service of the messages.

(3) A method in which the information about a time interval of sending a message includes the information about a minimum time interval:

If the message sending entity is a logical channel entity, the logical channel entity receives a message from the upper-layer entity at configured minimum sending time intervals. Specifically, when a time interval between a time point of sending a current message by the upper-layer entity to the logical channel entity and a time point of receiving a message by the logical channel entity last time is less than the minimum time interval, the logical channel entity refuses to receive or discards the current message. When a time interval between a time point of sending a current message by the upper-layer entity to the logical channel entity and a time point of receiving a message by the logical channel entity last time is not less than the minimum time interval, the logical channel entity receives the current message. It should be noted that the current message and the message received last time may be one message or a group of messages. This is not limited in the present invention.

If the message sending entity is specifically a media access entity, the media access entity receives messages from the logical channel entity at configured minimum sending time intervals. Specifically, when a time interval between a time point of sending a current message by the logical channel entity to the media access entity and a time point of sending a message by the media access entity to the logical channel entity last time is less than the minimum time interval of sending a message by the terminal, the media access entity does not request a sending resource for the current message. When a time interval between a time point of sending a current message by the logical channel entity to the media access entity and a time point of sending a message by the media access entity to the logical channel entity last time is not less than the minimum time interval of sending a message by the terminal, the media access entity requests a sending resource for the current message. It should also be noted that the current message and the message sent last time may be one message or a group of messages. This is not limited in the present invention.

In this way, the minimum time interval of sending a message by the terminal can be adjusted flexibly, a quantity of messages sent by the terminal within a time period can be reduced, and network congestion can be relieved.

In a terminal, there may be more than one message sending entity. For example, when the message sending entity is a logical channel entity, a logical channel entity may be set for each message type. Specifically, a logical channel entity may be established for a vehicle coordination message, and another logical channel entity may be established for an event message related to a vehicle environment. The same logic may be further applicable to a case in which the message sending entity is a message queue entity or a media access entity.

Corresponding to multiple possible message sending entities in a terminal, the information about a time interval of sending a message that is configured for each message sending entity may differ.

In a specific implementation process, the terminal may process, according to the network congestion control configuration information, all messages generated by the terminal.

Step 303: The terminal sends the processed message.

In a specific implementation process, in a scenario in which resources are not scheduled centrally, the terminal monitors channels, initiates resource contention on an idle channel, and after obtaining a sending resource, sends the message by using the sending resource.

In a specific implementation process, in a scenario in which resources are scheduled centrally, the terminal obtains a sending resource for the processed message, and the sending resource is used to send the message. If the terminal obtains the sending resource required for sending the message, the terminal sends the message by using the sending resource.

In a specific implementation process, the method in this embodiment may further include step 204: The terminal sends congestion status information to the network device, where the congestion status information is used to assist the network to generate the network congestion control configuration information or the network congestion level indication.

A condition for triggering the terminal to send the congestion status information to the network device may include at least one of the following:

the terminal sends the congestion status information to the network device if the terminal starts to request the required sending resource for the message and still does not obtain the sending resource when a first time point arrives;

the terminal sends the congestion status information to the network device if the terminal still does not obtain the sending resource from a time point of obtaining the message to a second time point;

the terminal sends the congestion status information to the network device if the terminal starts to request the sending resource for the message and still does not obtain the sending resource when a quantity of times of initiating a resource request exceeds a first threshold; or the terminal sends the congestion status information to the network device if the terminal still does not obtain the sending resource from a time point of obtaining the message until a quantity of discarded messages exceeds a second threshold.

The first time point, the second time point, the first threshold, and the second threshold may come from the preconfigured information of the terminal, or may be obtained according to the message from the network device. This is not limited in the present invention.

The congestion status information includes at least one of the following:

a time length during which the terminal determines that the required sending resource is not obtained; or a quantity of resource requesting times during which the terminal determines that the required sending resource is not obtained.

In a specific implementation process, the terminal sends the processed message in one of the following manners:

sending the message to another terminal by using a wireless interface between the terminals; or sending the message to a network device by using a wireless interface between the terminal and the network device.

According to the method in this embodiment of the present invention, the terminal obtains the information about a time interval of sending a message, processes, according to the network congestion control configuration information, the message generated by the terminal, and obtains the processed message, and then the terminal sends the processed message. According to the method in this embodiment of the present invention, the terminal can flexibly process, according to the information about a time interval of sending a message, a message generated by the terminal, and control the time interval of sending a message. In an application environment of the Internet of vehicles, the method in this embodiment of the present invention can be used to relieve a network congestion problem.

Embodiment 3

Figure 4:
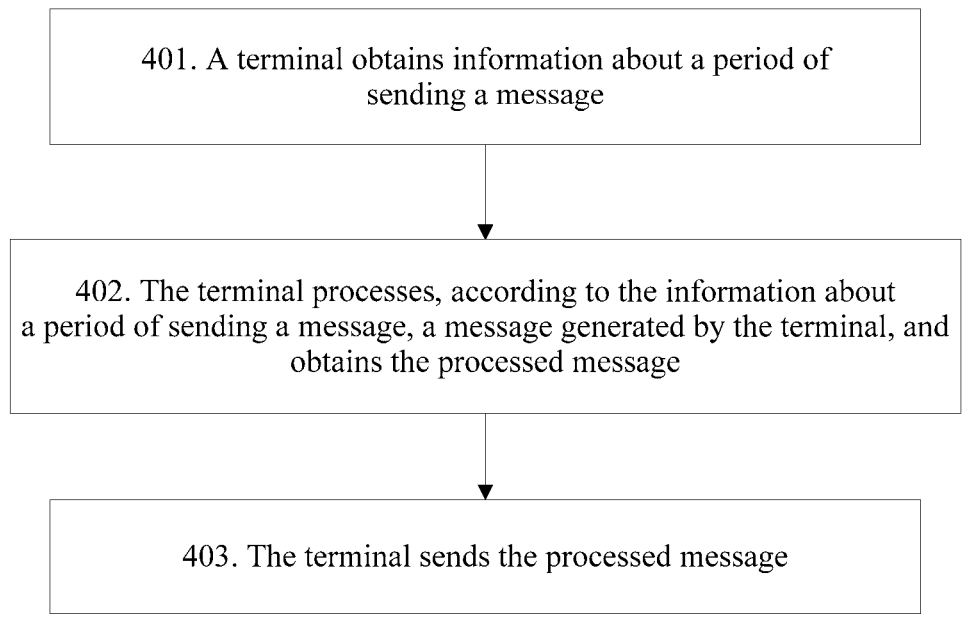
FIG. 4 is a flowchart of a message transmission method according to an embodiment of the present invention.

FIG. 4 shows an information transmission method according to this embodiment. The method provided in Embodiment 3 is much similar to the method provided in Embodiment 2 of the present invention. Similar content is not repeated herein any further. For details, refer to description of the corresponding part in Embodiment 2. This embodiment describes only differences from Embodiment 2.

In the method provided in this embodiment, network congestion control configuration information includes information about a period of sending a message. The method includes the following implementation steps.

Step 401: A terminal obtains information about a period of sending a message.

The information about a period of sending a message may include one or more of information about a maximum period of sending a message, information about a minimum period of sending a message, or information about a reference period of sending a message.

A method used by the terminal to obtain the information about a period of sending a message has been described in detail in Embodiment 2. Refer to the specific implementation manner of step 301 in Embodiment 2 of the present invention.

Step 402: The terminal processes, according to the information about a period of sending a message, a message generated by the terminal.

The terminal configures a message sending entity of the terminal according to the information about a period of sending a message, and the message sending entity processes a message from an upper-layer entity. As described in Embodiment 1, the message sending entity may be a logical channel entity, a message queue entity, or a media access entity. The information about a period of sending a message may include one or a combination of: information about a maximum period, information about a minimum period, or information about a reference period. A specific solution for the terminal to process the message is described below.

(1) A solution in which the information about a period of sending a message includes the information about a reference period:

If the message sending entity is a logical channel entity, the logical channel entity receives a message from the upper-layer entity according to a configured reference period.

If the message sending entity is a media access entity, the media access entity sends a message from a corresponding logical channel entity according to a configured reference period.

(2) A solution in which the information about a period of sending a message includes a maximum period:

If the message sending entity is a logical channel entity, the logical channel entity receives a message from the upper-layer entity according to a period that is not greater than the maximum period.

If the message sending entity is a media access entity, the media access entity sends a message from the logical channel entity according to a period that is not greater than the maximum period.

In this way, it can be ensured that a message of a corresponding message sending entity can be sent in the maximum period, so that quality of service QoS of the message is ensured.

(3) A method in which the information about a period of sending a message includes the information about a minimum period:

If the message sending entity is a logical channel entity, the logical channel entity receives a message from the upper-layer entity according to a configured minimum period. Specifically, when a period between a time point of sending a current message by the upper-layer entity to the logical channel entity and a time point of receiving a message by the logical channel entity last time is less than the configured minimum period, the logical channel entity refuses to receive or discards the current message. When a period between a time point of sending a current message by the upper-layer entity to the logical channel entity and a time point of receiving a message by the logical channel entity last time is not less than the minimum period, the logical channel entity receives the current message. It should be noted that the current message and the message received last time may be one message or a group of messages. This is not limited in the present invention.

If the message sending entity is specifically a media access entity, the media access entity receives messages from the logical channel entity according to the configured minimum period. Specifically, when a period between a time point of sending a current message by the logical channel entity to the media access entity and a time point of sending a message by the media access entity to the logical channel entity last time is less than the minimum period of sending a message by the terminal, the media access entity does not request a sending resource for the current message. When a time interval between a time point of sending a current message by the logical channel entity to the media access entity and a time point of sending a message by the media access entity to the logical channel entity last time is not less than the minimum period of sending a message by the terminal, the media access entity requests a sending resource for the current message. It should also be noted that the current message and the message sent last time may be one message or a group of messages. This is not limited in the present invention.

In this way, the minimum period of sending a message by the terminal can be restricted, a quantity of messages sent by the terminal within a time period can be reduced, and network congestion can be relieved.

In a terminal, there may be more than one message sending entity. For example, when the message sending entity is a logical channel entity, a logical channel entity may be set for each message type. Specifically, a logical channel entity may be established for a vehicle coordination message, and another logical channel entity may be established for an event message related to a vehicle environment. The same logic may be further applicable to a case in which the message sending entity is a message queue entity or a media access entity.

Corresponding to multiple possible message sending entities in a terminal, the information about a period of sending a message that is configured for each message sending entity may differ.

In a specific implementation process, the terminal may process, according to the network congestion control configuration information, all messages generated by the terminal.

Step 403: The terminal sends the processed message.

A method used by the terminal to send the processed message has been described in detail in Embodiment 2. Refer to the specific implementation manner of step 303 in Embodiment 2 of the present invention.

According to the method in this embodiment of the present invention, the terminal obtains the information about a period of sending a message, processes, according to the network congestion control configuration information, the message generated by the terminal, and obtains the processed message, and then the terminal sends the processed message. According to the method in this embodiment of the present invention, the terminal can flexibly process, according to the information about a period of sending a message, a message generated by the terminal, and control the period of sending a message. In an application environment of the Internet of vehicles, the method in this embodiment of the present invention can be used to relieve a network congestion problem.

Embodiment 4

Figure 5:
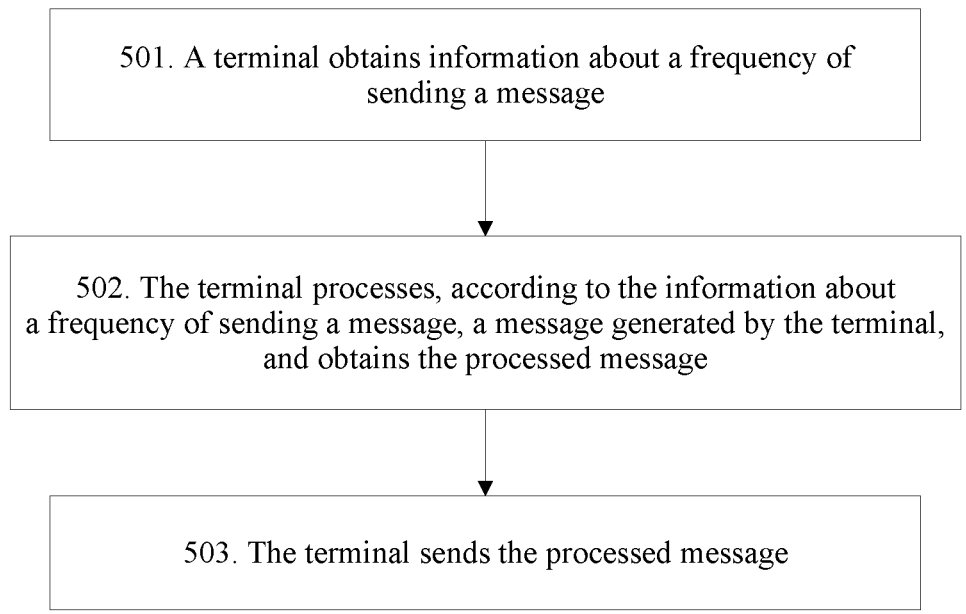
FIG. 5 is a flowchart of a message transmission method according to an embodiment of the present invention.

FIG. 5 shows an information transmission method according to this embodiment. The method provided in this embodiment is much similar to the method provided in Embodiment 2 of the present invention. Similar content is not repeated herein any further. For details, refer to description of the corresponding part in Embodiment 2. This embodiment describes only differences from Embodiment 2.

In the method provided in this embodiment, network congestion control configuration information includes information about a frequency of sending a message. The information about a frequency indicates a quantity of messages sent within a time period rather than a frequency of a carrier signal. The method includes the following implementation steps.

Step 501: A terminal obtains information about a frequency of sending a message.

The information about a frequency of sending a message may include one or more of information about a maximum frequency of sending a message, information about a minimum frequency of sending a message, or information about a reference frequency of sending a message.

A method used by the terminal to obtain the information about a frequency of sending a message has been described in detail in Embodiment 2. Refer to the specific implementation manner of step 301 in Embodiment 2 of the present invention.

Step 502: The terminal processes, according to the information about a frequency of sending a message, a message generated by the terminal.

The terminal configures a message sending entity of the terminal according to the information about a frequency of sending a message, and the message sending entity processes a message from an upper-layer entity. As described in Embodiment 1, the message sending entity may be a logical channel entity, a message queue entity, or a media access entity. The information about a frequency of sending a message may include one or a combination of: information about a maximum frequency, information about a minimum frequency, or information about a reference frequency. A specific solution for the terminal to process the message is described below.

(1) A solution in which the information about a frequency of sending a message includes the information about a reference frequency:

If the message sending entity is a logical channel entity, the logical channel entity receives a message from the upper-layer entity according to a configured reference frequency.

If the message sending entity is a media access entity, the media access entity sends a message from a corresponding logical channel entity according to a configured reference frequency.

(2) A solution in which the information about a frequency of sending a message includes a minimum frequency:

If the message sending entity is a logical channel entity, the logical channel entity receives a message from the upper-layer entity at a frequency that is not less than the minimum frequency.

If the message sending entity is a media access entity, the media access entity sends a message from the logical channel entity at a frequency that is not less than the minimum frequency.

In this way, the minimum frequency of sending a message can be ensured, so that quality of service QoS of the message is ensured.

(3) A method in which the information about a frequency of sending a message includes the information about a maximum frequency:

If the message sending entity is a logical channel entity, the logical channel entity receives a message from the upper-layer entity according to a configured maximum frequency. Specifically, when a frequency determined according to a time point of sending a current message by the upper-layer entity to the logical channel entity and a time point of receiving a message by the logical channel entity last time is greater than the configured maximum frequency, the logical channel entity refuses to receive or discards the current message. When a frequency determined according to a time point of sending a current message by the upper-layer entity to the logical channel entity and a time point of receiving the message by the logical channel entity last time is not greater than the maximum frequency, the logical channel entity receives the current message. It should be noted that the current message and the message received last time may be one message or a group of messages. This is not limited in the present invention.

If the message sending entity is specifically a media access entity, the media access entity receives a message from the logical channel entity at a configured maximum frequency. Specifically, when a frequency determined according to a time point of sending a current message by the logical channel entity to the media access entity and a time point of sending a message by the media access entity to the logical channel entity last time is less than the maximum frequency of sending a message by the terminal, the media access entity does not request a sending resource for the current message. When a frequency determined according to a time point of sending a current message by the logical channel entity to the media access entity and a time point of sending a message by the media access entity to the logical channel entity last time is not less than the maximum frequency of sending a message by the terminal, the media access entity requests a sending resource for the current message. It should also be noted that the current message and the message sent last time may be one message or a group of messages. This is not limited in the present invention.

In this way, the maximum frequency of sending a message by the terminal can be restricted, a quantity of messages sent by the terminal within a time period can be reduced, and network congestion can be relieved.

In a specific implementation process, the terminal may process, according to the network congestion control configuration information, all messages generated by the terminal.

Step 503: The terminal sends the processed message.

A method used by the terminal to send the processed message has been described in detail in Embodiment 2. Refer to the specific implementation manner of step 303 in Embodiment 2 of the present invention.

According to the method in this embodiment of the present invention, the terminal obtains the information about a period of sending a message, processes, according to the network congestion control configuration information, the message generated by the terminal, and obtains the processed message, and then the terminal sends the processed message. According to the method in this embodiment of the present invention, the terminal can flexibly process, according to the information about a period of sending a message, a message generated by the terminal, and control the period of sending a message. In an application environment of the Internet of vehicles, the method in this embodiment of the present invention can be used to relieve a network congestion problem.

A transmit power of a wireless signal decides coverage of the wireless signal to a great extent. In a case of considering the transmit power alone, a higher transmit power provides wider coverage, and a lower transmit power provides narrower coverage.

In the Internet of vehicles, although a high transmit power of a vehicle terminal can ensure signal coverage of the vehicle terminal, the high-power wireless signal may be an interference signal to other terminals or network devices, and may affect a network capacity and cause network congestion. Although a low transmit power of a terminal does not cause severe interference to other terminals or networks, but narrower coverage sometimes causes failure of a function of the terminal. For example, when a vehicle is in a high-speed driving state, a distant vehicle may be actually an object that imposes a safety threat. Therefore, a method for controlling the transmit power is required for the vehicle terminal, so that proper coverage can be ensured, and network congestion caused by an extremely high transmit power is avoided.

Embodiment 5

Figure 6:
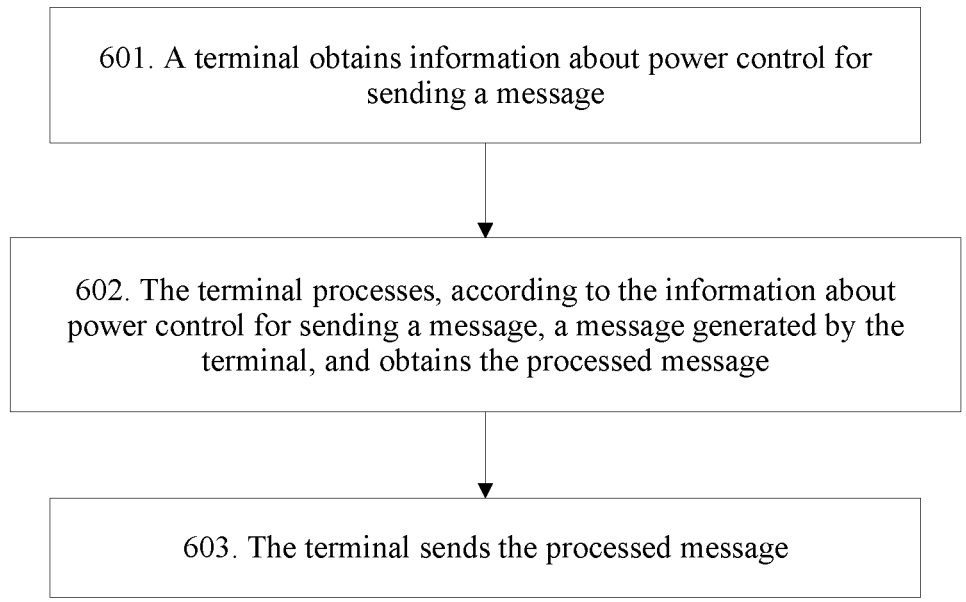
FIG. 6 is a flowchart of a message transmission method according to an embodiment of the present invention.

FIG. 6 shows an information transmission method according to this embodiment. The method provided in this embodiment is much similar to the method provided in Embodiment 2 of the present invention. Similar content is not repeated herein any further. For details, refer to description of the corresponding part in Embodiment 2. This embodiment describes only differences from Embodiment 2.

In the method provided in this embodiment, network congestion control configuration information includes information about power control for sending a message. The method includes the following implementation steps.

Step 601: A terminal obtains information about power control for sending a message.

The information about a frequency of sending a message may include one or more of information about a maximum transmit power for sending a message, information about a minimum transmit power for sending a message, or information about a reference transmit power for sending a message.

A method used by the terminal to obtain the information about power control for sending a message has been described in detail in Embodiment 2. Refer to the specific implementation manner of step 301 in Embodiment 2 of the present invention.

Step 602: The terminal processes, according to the information about power control for sending a message, a message generated by the terminal.

The terminal configures a message sending entity of the terminal according to the information about power control for sending a message, and the message sending entity processes a message from an upper-layer entity. The message sending entity may be a logical channel entity, a message queue entity, a media access entity, or a physical layer entity. The information about power control for sending a message may include one or a combination of: information about a maximum transmit power, information about a minimum transmit power, or information about a reference transmit power. A specific solution for the terminal to process the message is described below.

(1) A solution in which the information about power control for sending a message includes the information about a reference transmit power:

The information about a reference transmit power for sending a message is configured for the message sending entity, and the message sending entity processes the message according to the information about a reference transmit power. Specifically, the message sending entity may be a logical channel entity. The logical channel entity sets a transmit power to the reference transmit power for a message that passes through the logical channel entity. The message sending entity may be a media access entity, and the media access entity sets a transmit power to the reference transmit power for the to-be-sent message. The message sending entity may be a physical layer entity, and the physical layer entity sends the message according to the reference transmit power.

(2) A solution in which the information about power control for sending a message includes the information about a maximum power:

The maximum transmit power for sending a message by the terminal is configured for the message sending entity, and the message sending entity sets a transmit power for sending a message to be not greater than the maximum transmit power. Specifically, when a transmit power of a message is required to be greater than the maximum transmit power for transmitting, the terminal sends the message at the maximum transmit power. In a specific implementation process, the message sending entity determines whether the transmit power that is set for the message is greater than the configured maximum transmit power, and if yes, the message sending entity sets the transmit power of the message to the maximum transmit power; or if no, the message sending entity transmits the message at the original transmit power. In this way, it can be avoided that the terminal sends a message at an extremely high transmit power, unnecessary interference to a distant terminal of the Internet of vehicles is prevented, and local network congestion is avoided.

(3) A method in which the information about power control for sending a message includes the information about a minimum transmit power:

The minimum transmit power for sending a message by the terminal is configured for the message sending entity, and the message sending entity sets a transmit power for sending a message to be not less than the minimum transmit power. Specifically, when a transmit power of a message is set to be less than the minimum transmit power for transmitting, the terminal sends the message at the minimum transmit power. In a specific implementation process, the message sending entity determines whether the transmit power that is set for the message is greater than the configured minimum transmit power, and if yes, the message sending entity sets the transmit power of the message to the minimum transmit power. In this way, it is avoided that the terminal sends a message at an extremely low transmit power, and the extremely low transmit power causes an extremely narrow scope in which the message can be received.

Step 603: The terminal sends the processed message.

A method used by the terminal to send the processed message has been described in detail in Embodiment 2. Refer to the specific implementation manner of step 303 in Embodiment 2 of the present invention.

According to the method in this embodiment of the present invention, the terminal obtains the information about power control for sending a message, processes, according to the information about power control for sending a message, the message generated by the terminal, and obtains the processed message, and then the terminal sends the processed message. According to the method in this embodiment of the present invention, the terminal can flexibly process, according to the information about power control for sending a message, a message generated by the terminal, and control a transmit power for sending a message. In an application environment of the Internet of vehicles, the method in this embodiment of the present invention can be used to relieve a network congestion problem.

Embodiment 6

Figure 7:
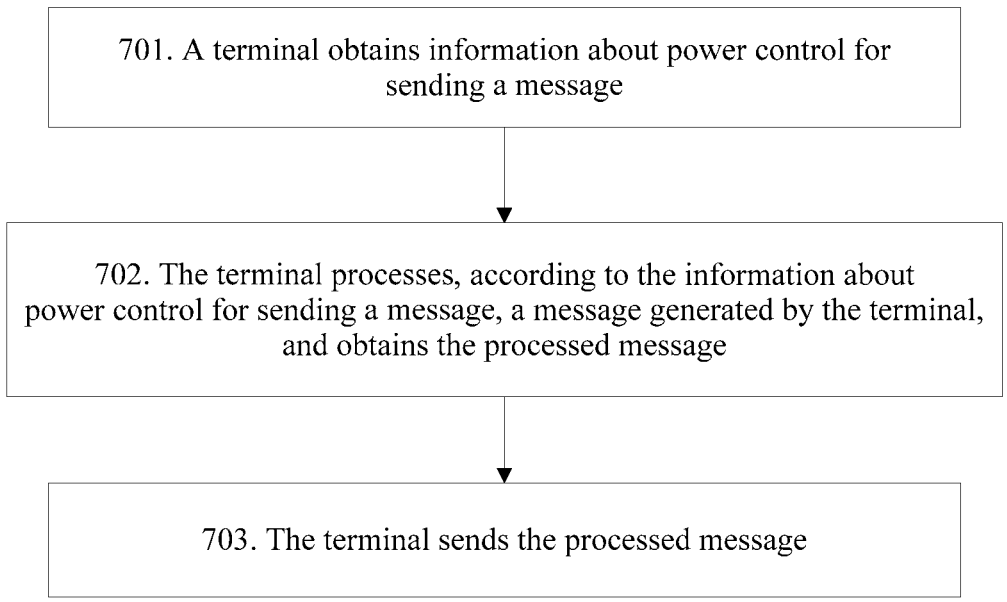
FIG. 7 is a flowchart of a message transmission method according to an embodiment of the present invention.

FIG. 7 shows an information transmission method according to this embodiment. The method provided in this embodiment is much similar to the method provided in Embodiment 2 of the present invention. Similar content is not repeated herein any further. For details, refer to description of the corresponding part in Embodiment 2. This embodiment describes only differences from Embodiment 2.

In the method provided in this embodiment, network congestion control configuration information includes information about power control for sending a message. The method includes the following implementation steps.

Step 701: A terminal obtains information about power control for sending a message.

The information about a frequency of sending a message may include one or more of information about a reference distance of sending a message, information about a maximum distance of sending a message, or information about a minimum distance of sending a message.

A method used by the terminal to obtain the information about power control for sending a message has been described in detail in Embodiment 2. Refer to the specific implementation manner of step 301 in Embodiment 2 of the present invention.

Step 702: The terminal processes, according to the information about power control for sending a message, a message generated by the terminal.

The terminal configures a message sending entity of the terminal according to the information about power control for sending a message, and the message sending entity processes a message from an upper-layer entity. The message sending entity may be a logical channel entity, a message queue entity, a media access entity, or a physical layer entity. The information about power control for sending a message may include one or a combination of: information about a reference distance of sending a message, information about a maximum distance of sending a message, or information about a minimum distance of sending a message. A specific solution for the terminal to process the message is described below.

(1) A solution in which the information about power control for sending a message includes the information about a reference distance:

A distance of sending a message is configured for the message sending entity, the message sending entity determines a used transmit power according to the distance, and the terminal sends the message according to the configured transmit power. Specifically, the transmit power may be represented by $PTX = A + 20\log(D) + 10\log(BW)$, where PTX represents a transmit power, D represents a transmission distance, BW represents a bandwidth resource that needs to be occupied for sending a message, and A is a constant related to a system.

(2) A solution in which the information about power control for sending a message includes the information about a maximum distance:

The maximum distance of sending a message is configured for the message sending entity, the message sending entity determines a used transmit power according to the distance, and the terminal sends the message according to the configured transmit power.

(3) A method in which the information about power control for sending a message includes the information about a minimum distance power:

The minimum distance of sending a message is configured for the message sending entity, the message sending entity determines a used transmit power according to the distance, and the terminal sends the message according to the configured transmit power.

Step 703: The terminal sends the processed message.

A method used by the terminal to send the processed message has been described in detail in Embodiment 2. Refer to the specific implementation manner of step 303 in Embodiment 2 of the present invention.

According to the method in this embodiment of the present invention, the terminal obtains the information about power control for sending a message, processes, according to the information about power control for sending a message, the message generated by the terminal, and obtains the processed message, and then the terminal sends the processed message. According to the method in this embodiment of the present invention, the terminal can flexibly process, according to the information about power control for sending a message, a message generated by the terminal, and control a transmit power for sending a message. In an application environment of the Internet of vehicles, the method in this embodiment of the present invention can be used to relieve a network congestion problem.

Embodiment 7

Figure 8:
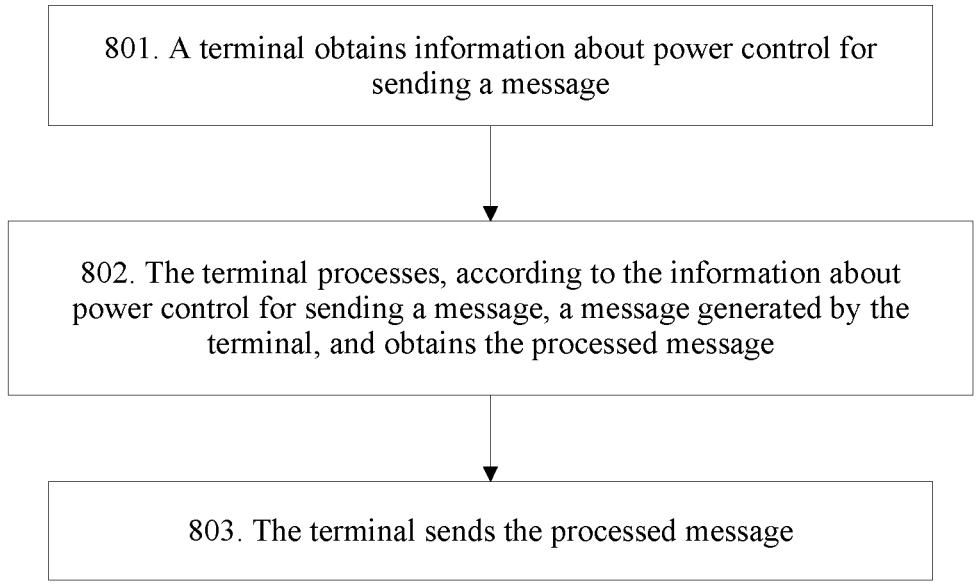
FIG. 8 is a flowchart of a message transmission method according to an embodiment of the present invention.

FIG. 8 shows an information transmission method according to this embodiment. The method provided in this embodiment is much similar to the method provided in Embodiment 2 of the present invention. Similar content is not repeated herein any further. For details, refer to description of the corresponding part in Embodiment 2. This embodiment describes only differences from Embodiment 2.

In the method provided in this embodiment, network congestion control configuration information includes information about power control for sending a message. The method includes the following implementation steps.

Step 801: A terminal obtains information about power control for sending a message.

The information about a frequency of sending a message may include one or more of a reference transmit power parameter for sending a message, a path loss power compensation parameter for sending a message, a movement speed power compensation parameter for sending a message, or a format power compensation parameter for sending a message.

A method used by the terminal to obtain the information about power control for sending a message has been described in detail in Embodiment 2. Refer to the specific implementation manner of step 301 in Embodiment 2 of the present invention.

Step 802: The terminal processes, according to the information about power control for sending a message, a message generated by the terminal.

The terminal configures a message sending entity of the terminal according to the information about power control for sending a message, and the message sending entity processes a message from an upper-layer entity. The message sending entity may be a logical channel entity, a message queue entity, a media access entity, or a physical layer entity. The information about power control for sending a message may include one or a combination of: a reference transmit power parameter for sending a message, a path loss power compensation parameter for sending a message, a movement speed power compensation parameter for sending a message, or a format power compensation parameter for sending a message. A specific solution for the terminal to process the message is described below.

(1) A solution in which the information about power control for sending a message includes the information about a reference transmit power:

The reference transmit power parameter for sending a message by the terminal is configured for the message sending entity, and the terminal sends a message according to the configured reference transmit power parameter. Specifically, a reference transmit power parameter is configured for the message sending entity. For example, the reference transmit power is PBASE (dBm). Another factor, such as a resource bandwidth, that affects the transmit power may be considered, and a transmit power for sending a message by the terminal is finally obtained by means of calculation. A possible transmit power for sending a message by the terminal is PTX=PBASE+10 log(BW), where PTX is a transmit power of the message, PBASE is a reference power parameter, and BW is a transmission bandwidth resource that needs to be occupied for sending the message.

(2) A solution in which the information about power control for sending a message includes the information about a path loss power compensation parameter:

The path loss power compensation parameter for sending a message by the terminal is configured for the message sending entity, and the message sending entity determines a transmit power of the message according to the path loss power compensation parameter, and the terminal sends the message according to the transmit power of the message. The path loss power compensation parameter may be used to adjust a path loss corresponding to a distance of sending the message. For different scenarios or different message types, different path loss power compensation parameters may be configured for a corresponding message sending entity. For example, in a traffic environment characterized by a traffic jam and a low speed, if expected coverage of sending a message by the terminal is narrow, the path loss power compensation parameter configured for the message sending entity may be relatively small. In a smooth traffic condition characterized by a high speed of vehicles, if expected coverage of sending a message by the terminal is wide, the path loss power compensation parameter configured for the message sending entity may be large. If expected coverage of location and speed messages sent by the terminal is wide, relatively large path loss power compensation parameters may be configured for message sending entities corresponding to such messages. If expected coverage of vehicle brand and model messages sent by the terminal is narrow, relatively small path loss power compensation parameters may be configured for message sending entities corresponding to such messages.

(3) A method in which the information about power control for sending a message includes the movement speed power compensation parameter:

The movement speed power compensation parameter for sending a message by the terminal is configured for the message sending entity, and the message sending entity determines a transmit power of a message according to the movement speed power compensation parameter, and the terminal sends the message according to the transmit power of the message. The movement speed power compensation parameter is used to compensate for transmit powers of vehicle terminals that run within different speed ranges. Generally, if a movement speed of a terminal is higher, compensation for a transmit power of the terminal is higher. In a specific implementation process, the movement speed power compensation parameter may be a parameter list or an index value for an element in a parameter list, or may be an equation. The terminal may determine a corresponding movement speed power compensation parameter according to a movement speed, and then determines a transmit power of a message.

(4) A method in which the information about power control for sending a message includes the format power compensation parameter for sending a message:

The message sending entity determines a transmit power of a message according to the format power compensation parameter for sending a message, and the terminal sends the message according to the transmit power of the message. Specifically, different power compensation values may be used according to different transmission rates, signal modulation schemes, and signal encoding and decoding modes. For example, when a high transmission rate or higher order modulation is used or when a coding gain is relatively low, a high power compensation parameter is used; or when a low transmission rate or lower order modulation is used or when a coding gain is relatively high, a low power compensation parameter is used.

In a specific implementation process, different power parameters may be configured for the message sending entity, and this is not limited in the present invention. Here is an example: A movement speed power compensation parameter, a basic transmit power parameter, and a path loss compensation parameter for sending a message by the terminal are configured for the message sending entity, a power for sending a message by the message sending entity is PTX, and PTX is expressed as:

PTX=α×PL+PBASE+10 log(BW), where α is a movement speed power compensation parameter, PL is a path loss compensation parameter, PBASE is a basic transmit power parameter, and BW is a bandwidth resource that needs to be occupied for sending a message. Because there may still be many other similar combinations, the present invention does not give description exhaustively. However, all implementation manners based on the idea of the present invention fall within the protection scope claimed by the present invention.

Step 803: The terminal sends the processed message.

A method used by the terminal to send the processed message has been described in detail in Embodiment 2. Refer to the specific implementation manner of step 303 in Embodiment 2 of the present invention.

According to the method in this embodiment of the present invention, the terminal obtains the information about power control for sending a message, processes, according to the information about power control for sending a message, the message generated by the terminal, and obtains the processed message, and then the terminal sends the processed message. According to the method in this embodiment of the present invention, the terminal can flexibly process, according to the information about power control for sending a message, a message generated by the terminal, and control a transmit power for sending a message. A transmit power used by the terminal to send a message can be controlled within a reasonable range. In an application environment of the Internet of vehicles, the method in this embodiment of the present invention can be used to relieve a network congestion problem.

In an environment of the Internet of vehicles, content of messages sent by a vehicle is diversified. A content length may differ, meanings of sent messages may differ, and a real-time message is different from a history message. If all messages generated by the terminal are sent in an indiscriminative manner, even if only a small quantity of vehicles communicate in a network, network congestion tends to occur. Consequently, information is not exchanged in time between vehicles.

Embodiment 8

Figure 9:
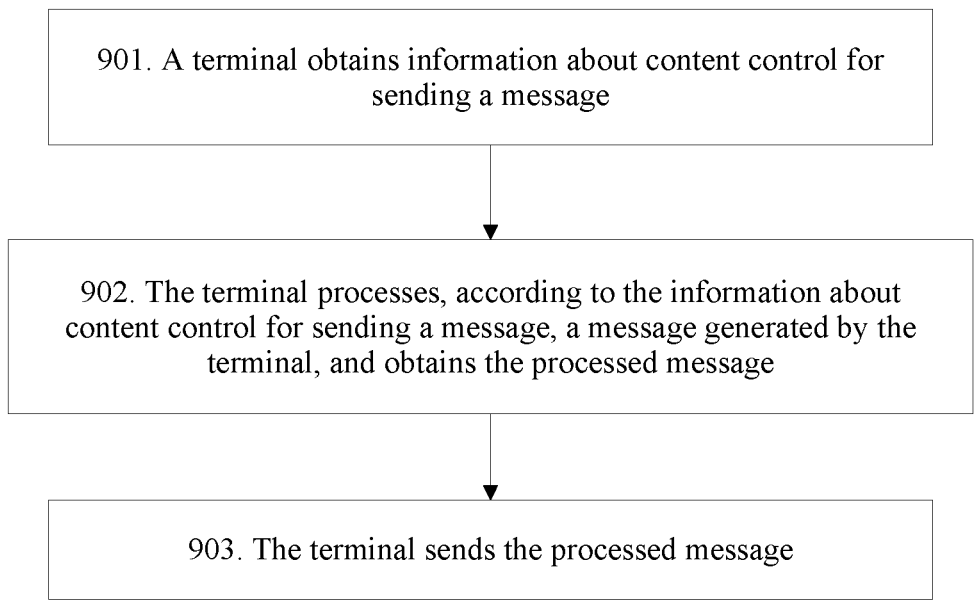
FIG. 9 is a flowchart of a message transmission method according to an embodiment of the present invention.

FIG. 9 shows an information transmission method according to this embodiment. The method provided in this embodiment is much similar to the method provided in Embodiment 2 of the present invention. Similar content is not repeated herein any further. For details, refer to description of the corresponding part in Embodiment 2. This embodiment describes only differences from Embodiment 2.

In the method provided in this embodiment, network congestion control configuration information includes information about content control for sending a message. The method includes the following implementation steps.

Step 901: A terminal obtains information about content control for sending a message.

The information about content control for sending a message may include one or more of information about a maximum length of sending a message, control information about a maximum quantity of physical resources occupied for sending a message, or content selection information for sending a message.

A method used by the terminal to obtain the information about content control for sending a message has been described in detail in Embodiment 2. Refer to the specific implementation manner of step 301 in Embodiment 2 of the present invention.

Step 902: The terminal processes, according to the information about content control for sending a message, a message generated by the terminal.

The terminal configures a message sending entity of the terminal according to the information about content control for sending a message, and the message sending entity processes a message from an upper-layer entity. The message sending entity may be a logical channel entity, a message queue entity, or a media access entity. A specific solution for the terminal to process the message is described below.

(1) A solution in which the information about content control for sending a message includes the control information about a maximum length of sending a message:

The control information about a maximum length of sending a message is configured for the message sending entity. Received messages are filtered according to the maximum length. If a length of a message generated by the upper-layer entity is greater than the maximum length configured for the message sending entity, the message sending entity blocks or discards the message. If a length of a message generated by the upper-layer entity is not greater than the maximum length configured for the message sending entity, the message sending entity sends the message. A specific operation depends on a specific form of the message sending entity. For example, if the message sending entity is a logical channel entity, the logical channel entity buffers the message, and sends the message to the media access layer entity. If the message sending entity is a media access entity, the media access entity obtains a sending resource for the message to facilitate sending. In this way, the terminal can control a length of a sent message and prevent the terminal from generating an extremely long message that occupies a channel in a long time and causes network congestion.

(2) A solution in which the information about content control for sending a message includes the control information about a maximum quantity of physical resources occupied for sending a message:

The maximum quantity of physical resources for sending a message is configured for the message sending entity. The maximum quantity of physical resources mentioned herein may be a size of physical resources that can be occupied in one-time sending, for example, a quantity of physical resource blocks, a quantity of transmission timeslots, a quantity of subcarriers, or a quantity of physical resource symbols. The message sending entity filters messages according to the configured maximum quantity of physical resources. Specifically, the message sending entity determines whether a message can be sent in a case in which the maximum quantity of physical resources is limited. If the message cannot be sent in such a case, the message sending entity discards or blocks the message. If the message can be sent in such a case, the message sending entity sends the message.

(3) A method in which the information about content control for sending a message includes the content selection information:

The message sending entity is configured to send or buffer a message having specific content. The content selection information is configured for the message sending entity, and a message from the upper-layer entity is processed according to the content selection information. Specifically, message sending entities are configured to send messages having different pieces of content. For example, a first message sending entity is configured to send basic information of a vehicle, a second message sending entity is configured to send high-frequency information of the vehicle, and a third message sending entity is configured to configure vehicle type information. Configuring the content selection information for the message sending entity is: according to a network congestion status, restriction on some information is loosened or enhanced accordingly. For example, when network load is high, the first message sending entity is allowed to process information, the second message sending entity is restricted from processing information, and the third message sending entity is forbidden to process information.

In this way, the message sending entity may be restricted according to message content corresponding to the message sending entity. The setting manner is flexible, and quality of service of important messages can still be ensured on a precondition of relieving network congestion.

Step 903: The terminal sends the processed message.

A method used by the terminal to send the processed message has been described in detail in Embodiment 2. Refer to the specific implementation manner of step 303 in Embodiment 2 of the present invention.

According to the method in this embodiment of the present invention, the terminal obtains the information about content control for sending a message, processes, according to the information about content control for sending a message, the message generated by the terminal, and obtains the processed message, and then the terminal sends the processed message. According to the method in this embodiment of the present invention, the terminal can flexibly process, according to information about content control for sending a message, a message generated by the terminal. In an application environment of the Internet of vehicles, the method in this embodiment of the present invention can be used to relieve a network congestion problem.

When other conditions are the same, a transmission rate of a message affects sensitivity of a receive end in receiving the message. For example, a relatively low transmission rate makes the receive end obtain relatively high sensitivity, and a relatively high transmission rate makes the receive end obtain relatively low sensitivity. However, a transmission rate of a message also affects time occupied for sending the message. For example, for a same message, a lower transmission rate causes occupation of a longer transmission time, and a higher transmission rate causes occupation of a shorter transmission time. In the Internet of vehicles, if a rate of sending a message by the vehicle terminal is extremely low, network congestion may be caused, a network capacity of the Internet of vehicles may be reduced, and information may not be exchanged between vehicles in time; or if a rate of sending a message by the vehicle terminal is extremely high, the receive end may be unable to receive the message correctly.

Embodiment 9

Figure 10:
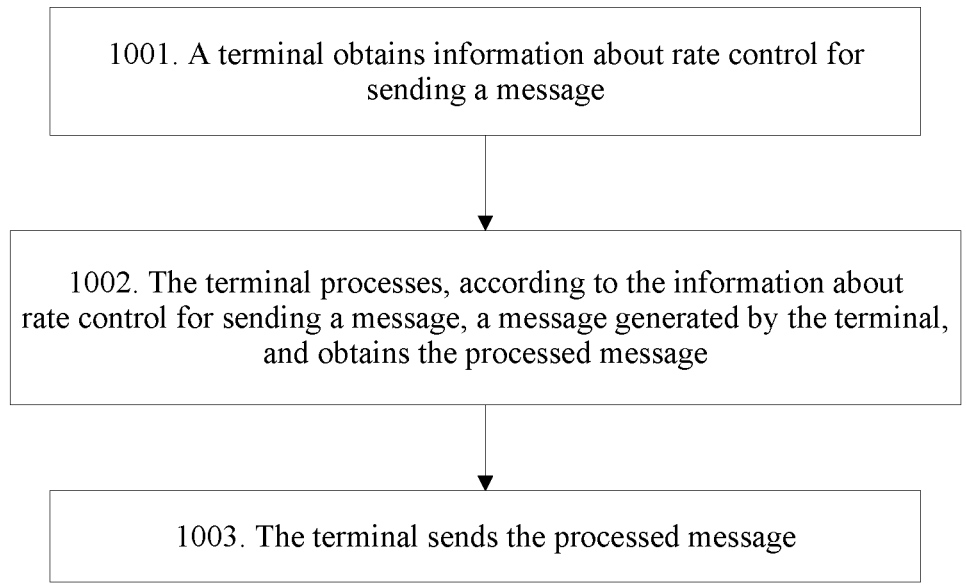
FIG. 10 is a flowchart of a message transmission method according to an embodiment of the present invention.

FIG. 10 shows an information transmission method according to this embodiment. The method provided in this embodiment is much similar to the method provided in Embodiment 2 of the present invention. Similar content is not repeated herein any further. For details, refer to description of the corresponding part in Embodiment 2. This embodiment describes only differences from Embodiment 2.

In the method provided in this embodiment, network congestion control configuration information includes information about rate control for sending a message. The method includes the following implementation steps.

Step 1001: A terminal obtains information about rate control for sending a message.

The information about rate control for sending a message may include one or more of information about a highest rate of sending a message, or information about a lowest rate of sending a message.

A method used by the terminal to obtain the information about rate control for sending a message has been described in detail in Embodiment 2. Refer to the specific implementation manner of step 301 in Embodiment 2 of the present invention.

Step 1002: The terminal processes, according to the information about rate control for sending a message, a message generated by the terminal.

The terminal configures a message sending entity of the terminal according to the information about rate control for sending a message, and the message sending entity processes a message from an upper-layer entity. The message sending entity may be a logical channel entity, a message queue entity, or a media access entity. A specific solution for the terminal to process the message is described below.

(1) A solution in which the information about content control for sending a message includes the information about a highest rate of sending a message:

A highest transmission rate of sending a message is configured for the message sending entity. If the message sending entity determines that a transmission rate required by a message generated by the upper-layer entity is greater than the highest transmission rate, the message sending entity discards or blocks the message, or transmits the message at the configured highest transmission rate.

(2) A solution in which the information about content control for sending a message includes the information about a lowest rate of sending a message:

A lowest transmission rate of sending a message is configured for the message sending entity. If the message sending entity determines that a transmission rate required by a message generated by the upper-layer entity is less than the lowest transmission rate, the message sending entity sends the message at the configured lowest transmission rate.

Step 1003: The terminal sends the processed message.

A method used by the terminal to send the processed message has been described in detail in Embodiment 2. Refer to the specific implementation manner of step 303 in Embodiment 2 of the present invention.

According to the method in this embodiment of the present invention, the terminal obtains the information about content control for sending a message, processes, according to the information about content control for sending a message, the message generated by the terminal, and obtains the processed message, and then the terminal sends the processed message. According to the method provided in this embodiment, a transmission rate of sending a message by the terminal can be controlled within a reasonable range, thereby avoiding network congestion caused by an extremely low transmission rate of sending a message and preventing an extremely high transmission rate of sending a message from affecting message quality.

When other conditions are the same, a modulation scheme of a message affects sensitivity of a receive end in receiving the message. For example, a higher order modulation scheme causes a high utilization ratio of spectrums, and a greater data transmission amount is obtained under a condition of occupying a same frequency bandwidth and time length, but interference immunity is generally poor; and a lower order modulation scheme causes a low utilization ratio of spectrums, and a transmission rate is low, but interference immunity is better. In the Internet of vehicles, network congestion can be relieved by configuring a modulation scheme during message sending.

Embodiment 10

Figure 11:
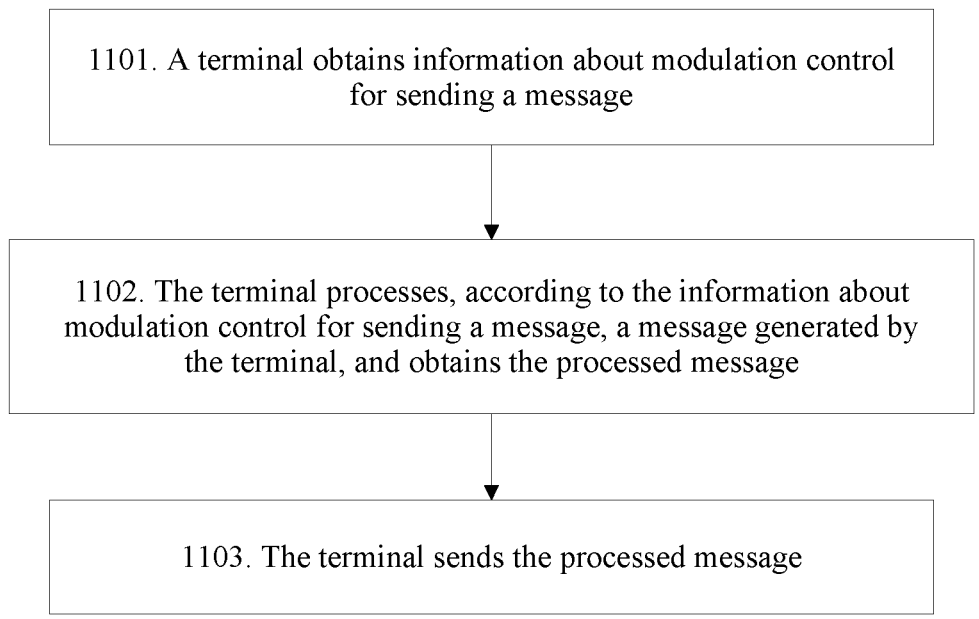
FIG. 11 is a flowchart of a message transmission method according to an embodiment of the present invention.

FIG. 11 shows an information transmission method according to this embodiment. The method provided in this embodiment is much similar to the method provided in Embodiment 2 of the present invention. Similar content is not repeated herein any further. For details, refer to description of the corresponding part in Embodiment 2. This embodiment describes only differences from Embodiment 2.

In the method provided in this embodiment, network congestion control configuration information includes information about modulation control for sending a message. The method includes the following implementation steps.

Step 1101: A terminal obtains information about modulation control for sending a message.

The information about modulation control for sending a message may include one or more of information about a highest modulation order for sending a message, or information about a lowest modulation order for sending a message.

A method used by the terminal to obtain the information about modulation control for sending a message has been described in detail in Embodiment 2. Refer to the specific implementation manner of step 301 in Embodiment 2 of the present invention.

Step 1102: The terminal processes, according to the information about modulation control for sending a message, a message generated by the terminal.

The terminal configures a message sending entity of the terminal according to the information about modulation control for sending a message, and the message sending entity processes a message from an upper-layer entity. The message sending entity may be a logical channel entity, a message queue entity, or a media access entity. A specific solution for the terminal to process the message is described below.

(1) A solution in which the information about content control for sending a message includes the information about a highest rate of sending a message:

A highest modulation order for sending a message is configured for the message sending entity. The message sending entity determines whether a modulation order required by a message generated by the upper-layer entity is higher than the highest modulation order. If yes, the message sending entity sends the message at the highest modulation order.

(2) A solution in which the information about content control for sending a message includes the information about a lowest rate of sending a message:

A lowest modulation order for sending a message is configured for the message sending entity. The message sending entity determines whether a modulation order required by a message generated by the upper-layer entity is lower than the lowest modulation order. If yes, the message sending entity sends the message at the lowest modulation order.

Step 1103: The terminal sends the processed message.

A method used by the terminal to send the processed message has been described in detail in Embodiment 2. Refer to the specific implementation manner of step 303 in Embodiment 2 of the present invention.

According to the method in this embodiment of the present invention, the terminal obtains the information about modulation control for sending a message, processes, according to the information about modulation control for sending a message, the message generated by the terminal, and obtains the processed message, and then the terminal sends the processed message. According to the method provided in this embodiment, a modulation order for sending a message by the terminal can be controlled within a reasonable range, and network congestion is avoided.

Embodiment 11

Figure 12:
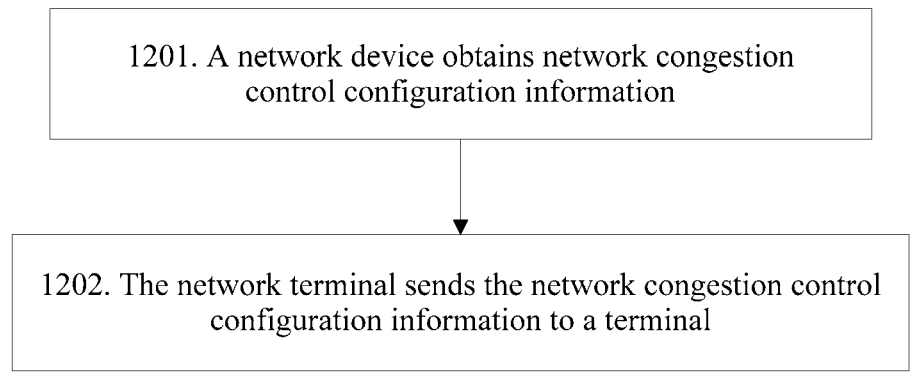
FIG. 12 is a flowchart of a message transmission method according to an embodiment of the present invention.

FIG. 12 shows a message transmission method according to this embodiment of the present invention. The method in this embodiment of the present invention may be executed by a network device. The network device may be a base station, an evolved NodeB, or a micro base station. This is not limited in the present invention. The method includes the following steps.

Step 1201: A network device obtains network congestion control configuration information.

The network congestion control configuration information corresponds to a network congestion status of a network in which the terminal is located. In a specific implementation process, if network congestion is severer, the corresponding network congestion control configuration information is more restrictive to message sending.

The network congestion control configuration information may include at least one or a combination of: information about a time interval of sending a message, information about a period of sending a message, information about a frequency of sending a message, information about power control for sending a message, information about content control for sending a message, or information about rate control for sending a message. The network congestion control configuration information may further include other information. This is not limited in the present invention.

In a specific implementation process, each type of network congestion control configuration information may include more specific information. For example, the information about a time interval of sending a message includes one or a combination of: information about a minimum time interval of sending a message, information about a maximum time interval, or information about a reference time interval.

The information about a period of sending a message includes one or a combination of: information about a maximum period of sending a message, information about a minimum period, or information about a reference period.

The information about a frequency of sending a message includes one or a combination of: information about a maximum frequency of sending a message, information about a minimum frequency, or information about a reference frequency. The frequency mentioned herein does not refer to a carrier frequency, but refers to the frequency corresponding to a quantity of times of sending a message per unit time.

The information about power control for sending a message includes one or a combination of: information about a maximum transmit power for sending a message, information about a minimum transmit power, or information about a reference transmit power; or the information about power control for sending a message includes one or a combination of: a reference transmit power parameter for sending a message, a path loss power compensation parameter, a movement speed power compensation parameter, or a format power compensation parameter; or the information about power control for sending a message includes one or a combination of: information about a reference distance of sending a message, information about a maximum distance, or information about a minimum distance.

The information about content control for sending a message includes one or a combination of: information about a maximum length of sending a message, control information about a maximum quantity of physical resources occupied for sending a message, or content selection information for sending a message.

The information about rate control for sending a message includes one or a combination of: information about a highest rate of sending a message, or information about a lowest rate.

In a specific process of implementing step 1201, that the network device obtains network congestion control configuration information includes:

(1) The network device determines the network congestion control configuration information according to congestion status information sent by the terminal.

In a process of requesting a sending resource for sending a message by the terminal, the sending resource required for sending the message may be unavailable. The terminal may send congestion status information to the network device. The congestion status information may include the following information:

a time length during which the terminal determines that the required sending resource is not obtained; and a quantity of resource requesting times during which the terminal determines that the required sending resource is not obtained.

The network device may learn a network congestion status according to the congestion status information, and determine the network congestion control configuration information according to the network congestion status.

(2) The network device determines the network congestion control configuration information according to a channel load status sent by the terminal. The channel load status includes a result obtained by the terminal by measuring a load status of an environment in which the terminal is located.

The terminal measures a channel load status of the environment in which the terminal is located, and sends the channel load status information to the network device, so that the network device determines a network congestion control configuration parameter according to the channel load status information. A specific implementation manner may include: measuring a received data volume within a specified time range, and if the received data volume is relatively large, it indicates that channel load is relatively high; Alternatively, wireless signal intensity of a channel within a specified time range may be measured. If the wireless signal intensity is relatively high, it indicates that another terminal occupies the channel, and signal interference occurs when the terminal sends data currently. Therefore, it is determined that wireless channel load is relatively high. Alternatively, a transmission rate of a wireless channel may be measured, that is, a rate of data received per unit time. If the rate of the received data is relatively high, it is determined that channel load is relatively high. Alternatively, duration of the load status may be measured, for example, a time length that signal strength of a channel lasts, or a time length that a receiving rate lasts. Alternatively, a channel occupation time may be measured, that is, a time length of occupying a wireless channel by another terminal for sending data. Alternatively, a channel busy time may be measured, for example, if a channel occupation time exceeds a threshold in a unit measurement time, it is considered that the channel is busy. The channel busy time refers to a time length that the state lasts.

Step 1202: The network device sends the network congestion control configuration information to a terminal, where the network control configuration information is used by the terminal to process, according to the network control configuration information, a message generated by the terminal.

A method for sending, by the network device, the network congestion control configuration information to the terminal may include one of the following.

(1) The network device sends dedicated signaling to the terminal. The dedicated signaling includes the network congestion control configuration information, and is used by the terminal to determine the network congestion control configuration information according to the dedicated signaling. Specifically, in a unicast scenario, a connection is established between the terminal and the network device. The network device sends a message to the terminal, and the terminal may determine the network congestion control configuration information according to the message sent by the network device. The dedicated signaling (English: Dedicated Signal) refers to signaling sent by the network device when point-to-point communication is performed between the terminal and the network device. In this way, the network device may perform well-targeted and more flexible configuration according to types of vehicles. For example, for some special vehicles, looser network congestion control configuration options may be provided, for example, for vehicles such as an ambulance and a fire engine, the network device may allow a vehicle terminal to send a message at shorter time intervals, or send a message at a higher power, or the like.

(2) The network device sends packet control signaling to a group of terminals. The packet control signaling includes the network congestion control configuration information, and is used by a terminal in this group to determine the network congestion control configuration information according to the message. Specifically, in a multicast scenario, the terminal obtains a group identifier by means of preconfiguration, or obtains a group identifier from the network device, determines the group in which the terminal is located, and then monitors the message sent by the network to the group, so as to determine the network congestion configuration information.

(3) The network device sends a broadcast message. The broadcast message includes the network congestion control configuration information, and is used by the terminal to obtain the network congestion control configuration information according to the broadcast message. In a broadcast scenario, the network device broadcasts a terminal communication configuration parameter in a coverage area. Before performing communication, the terminal receives broadcast information from the network device, and determines the network congestion control configuration information according to the broadcast information. Specifically, the network device adds, to the broadcast information, a special system information block (System Information Block) that is to be broadcast to the terminal, for example, a system information block that is sent to a terminal applied in the Internet of vehicles may be a vehicle direct communication system information block Vehicle Direct Communication Block (VDC-SIB), or a vehicle safety communication system information block Vehicle Safety Communication System Information Block (VSC-SIB), and the system information block includes the network congestion control configuration information. In this way, the network device may determine the broadcast information according to a network status of an area in which the network device is located. For example, if the network device detects, by means of monitoring, that few vehicles are in the coverage, the network device allows the terminal to send a message by using looser network congestion control configuration options; or if the network device detects, by means of monitoring, that network congestion in the coverage is relatively severe, the network device tightens the network congestion control options for the terminal, for example, requires the terminal to send a message at a lower power or at longer transmission time intervals. In this way, the terminal can obtain network congestion control configuration information related to a real-time road status, and the network device does not need to establish a connection to each terminal, thereby simplifying network device design.

(4) The network device sends a network congestion level indication to the terminal. The network congestion level indication is used by the terminal to determine the network congestion control configuration information.

In a specific implementation process, the network device sends the network congestion control configuration information to a terminal. The network control configuration information is used by the terminal to process, according to the network control configuration information, a message generated by the terminal. The network congestion control configuration information may include at least one or a combination of: information about a time interval of sending a message, information about a period of sending a message, information about a frequency of sending a message, information about power control for sending a message, information about content control for sending a message, or information about rate control for sending a message. The network congestion control configuration information may further include other information. The network sends the foregoing specific network congestion control configuration information. For a process of processing a message by the terminal according to the specific network congestion control configuration information, refer to Embodiment 2 to Embodiment 10 of the present invention, and no repeated description is given herein any further.

According to the method in this embodiment of the present invention, the network device obtains the network congestion control configuration information, and the network sends the network congestion control configuration information to the terminal. The network control configuration information is used by the terminal to process, according to the network control configuration information, a message generated by the terminal. According to the method in this embodiment of the present invention, the network device can provide network congestion control configuration information for the terminal, so that the terminal can flexibly process a message generated by the terminal. In an application environment of the Internet of vehicles, the method in this embodiment of the present invention can be used to relieve a network congestion problem.

Embodiment 12

Figure 13:
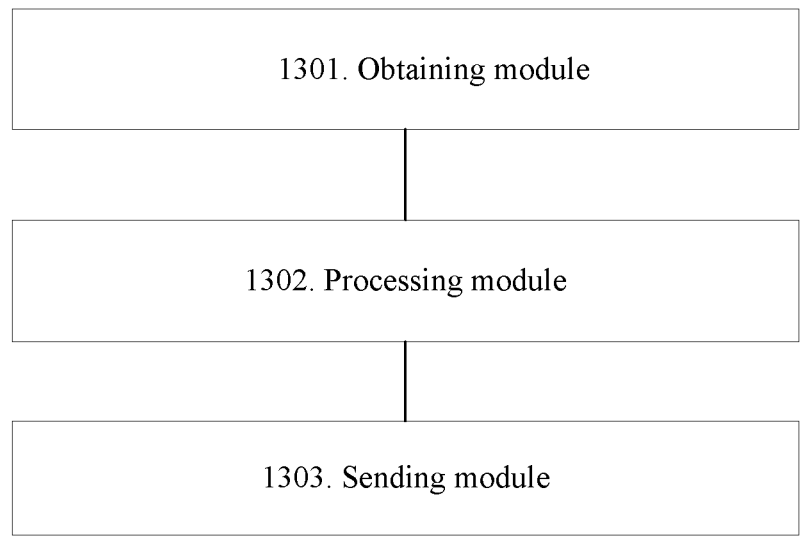
FIG. 13 is a block diagram of a message transmission apparatus according to an embodiment of the present invention.

FIG. 13 shows a message transmission apparatus according to this embodiment. The apparatus includes: an obtaining module 1301, a processing module 1302, and a sending module 1303.

The obtaining module 1301 is configured to obtain network congestion control configuration information.

The network congestion control configuration information may include the following information: information about a time interval of sending a message; information about a period of sending a message; information about a frequency of sending a message; information about power control for sending a message; information about content control for sending a message; and information about rate control for sending a message. The network congestion control configuration information may further include other types of configuration information, and this is not limited in the present invention. For how the obtaining module 1301 obtains the network congestion control configuration information, refer to Embodiments 1 to 10, and no repeated description is given herein any further.

In a specific implementation process, each type of network congestion control configuration information may include more specific information. For example, the information about a time interval of sending a message includes one or a combination of: information about a minimum time interval of sending a message, information about a maximum time interval, or information about a reference time interval.

The information about a period of sending a message includes one or a combination of: information about a maximum period of sending a message, information about a minimum period, or information about a reference period.

The information about a frequency of sending a message includes one or a combination of: information about a maximum frequency of sending a message, information about a minimum frequency, or information about a reference frequency. The frequency mentioned herein does not refer to a carrier frequency, but refers to a frequency corresponding to a quantity of times of sending a message per unit time.

The information about power control for sending a message includes one or a combination of: information about a maximum transmit power for sending a message, information about a minimum transmit power, or information about a reference transmit power; or the information about power control for sending a message includes one or a combination of: a reference transmit power parameter for sending a message, a path loss power compensation parameter, a movement speed power compensation parameter, or a format power compensation parameter; or the information about power control for sending a message includes one or a combination of: information about a reference distance of sending a message, information about a maximum distance, or information about a minimum distance.

The information about content control for sending a message includes one or a combination of: information about a maximum length of sending a message, control information about a maximum quantity of physical resources occupied for sending a message, or content selection information for sending a message.

The information about rate control for sending a message includes one or a combination of: information about a highest rate of sending a message, or information about a lowest rate.

In a specific implementation process, the obtaining module 1301 is configured to:

(1) obtain the network congestion control configuration information according to preconfigured information;

(2) obtain the network congestion control configuration information according to a message sent by a network device; where in a specific implementation process, the obtaining module determines the network congestion control configuration information according to dedicated signaling sent by the network device; or the obtaining module determines the network congestion control configuration information according to packet control signaling sent by the network device; or the obtaining module determines the network congestion control configuration information according to a broadcast message sent by the network device;

(3) obtain the network congestion control configuration information according to a channel load status; and (4) determine the network congestion control configuration information according to a network congestion level indication.

For how the obtaining module 1301 obtains the network congestion control configuration information according to the preconfigured information, obtains the network congestion control configuration information according to the message sent by the network device, obtains the network congestion control configuration information according to the channel load status, and determines the network congestion control configuration information according to the network congestion level indication, refer to Embodiments 1 to 10, and no repeated description is given herein any further.

The processing module 1302 is configured to: process, according to the network congestion control configuration information, a message generated by a terminal, and output the processed message.

According to different pieces of network congestion control configuration information, methods used by the processing module 1302 to process the message generated by the terminal are different. Specific implementation manners are described in detail in Embodiment 1 to Embodiment 10, and no repeated description is given herein any further.

The sending module 1303 is configured to send the processed message.

In a specific implementation process, to send the processed message, a resource obtaining module is required, and the resource obtaining module is configured to obtain a sending resource required for sending the processed message.

If it is determined that the sending resource required for sending the processed message is obtained, the sending module is configured to send the processed message.

If it is determined that the sending resource required for sending the processed message is not obtained, the sending module is configured to send network congestion status information. The network congestion status information is used to assist the network device to generate the network congestion control configuration information or the network congestion level indication.

That the resource obtaining module may be configured to determine that the sending resource required for sending the processed message is not obtained specifically includes:

if the resource obtaining module starts to request the required sending resource for the message and still does not obtain the sending resource when a first time point arrives, the resource obtaining module determines that the sending resource required for sending the message is not obtained;

if the resource obtaining module still does not obtain the sending resource from a time point of obtaining the message to a second time point, the resource obtaining module determines that the sending resource required for sending the message is not obtained;

if the resource obtaining module starts to request the required sending resource for the message and still does not obtain the sending resource when a quantity of times of initiating a resource request exceeds a first threshold, the resource obtaining module determines that the sending resource required for sending the message is not obtained; or if the resource obtaining module still does not obtain the sending resource from a time point of obtaining the message until a quantity of discarded messages exceeds a second threshold, the resource obtaining module determines that the sending resource required for sending the message is not obtained.

The congestion status information includes at least one of the following:

a time length during which the resource obtaining module determines that the required sending resource is not obtained; or a quantity of resource requesting times during which the resource obtaining module determines that the required sending resource is not obtained.

For specific working manners of the functional modules and units in this apparatus embodiment of the present invention, refer to the corresponding method embodiments of the present invention. The functional modules and units in this apparatus embodiment of the present invention can be implemented separately, or may be integrated in one or more units.

According to the technical solution of the present invention, the terminal processes, according to the network congestion control configuration information, the message generated by the terminal. According to the method in this embodiment of the present invention, the terminal can flexibly process, according to the network congestion control configuration information, a message generated by the terminal. In an application environment of the Internet of vehicles, the method in this embodiment of the present invention can be used to relieve a network congestion problem.

Embodiment 13

Figure 14:
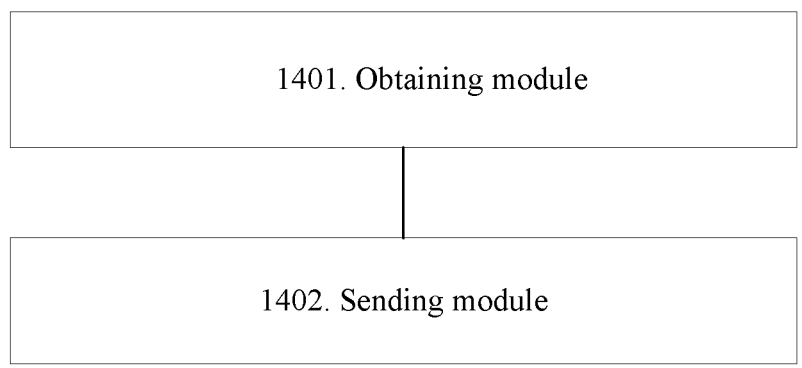
FIG. 14 is a block diagram of a message transmission apparatus according to an embodiment of the present invention.

FIG. 14 shows a message transmission apparatus according to this embodiment. The apparatus includes: an obtaining module 1401, and a sending module 1402.

The obtaining module 1401 is configured to obtain network congestion control configuration information.

The network congestion control configuration information may include the following information: information about a time interval of sending a message; information about a period of sending a message; information about a frequency of sending a message; information about power control for sending a message; information about content control for sending a message; and information about rate control for sending a message. The network congestion control configuration information may further include other types of configuration information. This is not limited in the present invention.

In a specific implementation process, each type of network congestion control configuration information may include more specific information. For example, the information about a time interval of sending a message includes one or a combination of: information about a minimum time interval of sending a message, information about a maximum time interval, or information about a reference time interval.

The information about a period of sending a message includes one or a combination of: information about a maximum period of sending a message, information about a minimum period, or information about a reference period.

The information about a frequency of sending a message includes one or a combination of: information about a maximum frequency of sending a message, information about a minimum frequency, or information about a reference frequency. The frequency mentioned herein does not refer to a carrier frequency, but refers to a frequency corresponding to a quantity of times of sending a message per unit time.

The information about power control for sending a message includes one or a combination of: information about a maximum transmit power for sending a message, information about a minimum transmit power, or information about a reference transmit power; or the information about power control for sending a message includes one or a combination of: a reference transmit power parameter for sending a message, a path loss power compensation parameter, a movement speed power compensation parameter, or a format power compensation parameter; or the information about power control for sending a message includes one or a combination of: information about a reference distance of sending a message, information about a maximum distance, or information about a minimum distance.

The information about content control for sending a message includes one or a combination of: information about a maximum length of sending a message, control information about a maximum quantity of physical resources occupied for sending a message, or content selection information for sending a message.

The information about rate control for sending a message includes one or a combination of: information about a highest rate of sending a message, or information about a lowest rate.

In a specific implementation process, the obtaining module 1401 is configured to:

(1) determine the network congestion control configuration information according to congestion status information sent by the terminal; or (2) determine the network congestion control configuration information according to a channel load status sent by the terminal.

The channel load status includes a result obtained by the terminal by measuring a load status of an environment in which the terminal is located.

The congestion status information includes at least one of the following:

a time length during which the terminal determines that the required sending resource cannot be obtained; or a quantity of resource requesting times during which the terminal determines that the required sending resource cannot be obtained.

The sending module 1402 is configured to send the network congestion control configuration information to the terminal.

A method used by the sending module to send the network congestion control configuration information to the terminal includes:

(1) the sending module is configured to send dedicated signaling to the terminal, where the dedicated signaling includes the network congestion control configuration information;

(2) the sending module is configured to send packet control signaling to the terminal, where the packet control signaling includes the network congestion control configuration information;

(3) the sending module is configured to send a broadcast message, where the broadcast message includes the network congestion control configuration information; or (4) the sending module is configured to send a network congestion level indication to the terminal, where the network congestion level indication is used by the terminal to determine the network congestion control configuration information.

Embodiment 14

A system is provided in this embodiment. The system includes at least two terminals. For an implementation manner of each terminal, refer to Embodiments 1 to 10, and no repeated description is given herein any further.

The system may further include at least one terminal and at least one network device. For an implementation manner of each terminal, refer to Embodiments 1 to 10; and for an implementation manner of each network device, refer to Embodiments 1 to 13, and no repeated description is given herein any further.

A person skilled in the art may clearly understand that, the technologies in the present invention may be implemented by software in addition to a necessary general hardware platform. Based on such an understanding, the technical solutions of the present invention essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A message transmission method, comprising:

measuring, by a terminal, a channel load status;

obtaining, by the terminal according to the channel load status, network congestion control configuration information based on preconfigured information in the terminal, wherein the network congestion control configuration information comprises a highest modulation order for sending a first message, a lowest modulation order for sending the first message, and a maximum quantity of physical resources allowed for sending the first message, wherein the highest modulation order and the lowest modulation order define a range of modulation orders available for sending the first message; and sending, by the terminal according to the network congestion control configuration information, the first message to another terminal.

2. The method according to claim 1, wherein the network congestion control configuration information further comprises at least one of the following information:

information about power control for sending the first message; and information about rate control for sending the first message.

3. The method according to claim 2, wherein the network congestion control configuration information comprises information about power control for sending the first message, and the information about the power control for sending the first message comprises a maximum transmit power for sending the first message.

4. The method according to claim 2, wherein the network congestion control configuration information comprises information about rate control for sending the first message, and the information about the rate control for sending the first message comprises information about a highest rate of sending the first message.

5. An apparatus, comprising:

a non-transitory memory comprising instructions; and a processor in communications with the non-transitory memory, wherein the processor is configured to execute the instructions to:

measure a channel load status;

obtain, according to the channel load status, network congestion control configuration information based on preconfigured information in the apparatus, wherein the network congestion control configuration information comprises a highest modulation order for sending a first message, a lowest modulation order for sending the first message, and a maximum quantity of physical resources allowed for sending the first message, wherein the highest modulation order and the lowest modulation order define a range of modulation orders available for sending the first message; and cause a transmitter to send the first message to a terminal according to the network congestion control configuration information.

6. The apparatus according to claim 5, the network congestion control configuration information further comprises at least one of the following information:
information about power control for sending the first message; and
information about rate control for sending the first message.

7. The apparatus according to claim 6, wherein the network congestion control information comprises information about power control for sending the first message, and the information about the power control for sending the first message comprises a maximum transmit power for sending the first message.

8. The apparatus according to claim 6, wherein the network congestion control information comprises information about rate control for sending the first message, and the information about the rate control for sending the first message comprises information about a highest rate of sending the first message.

9. A non-transitory computer-readable medium storing computer instructions that, when executed by one or more processors, cause a terminal to perform the steps of:
measuring a channel load status;
obtaining, according to the channel load status, network congestion control configuration information based on preconfigured information, wherein the network congestion control configuration information comprises a highest modulation order for sending a first message, a lowest modulation order for sending the first message, and a maximum quantity of physical resources allowed for sending the first message, wherein the highest modulation order and the lowest modulation order define a range of modulation orders available for sending the first message; and
sending the first message to a terminal according to the network congestion control configuration information.

10. The non-transitory computer-readable medium according to claim 9, the network congestion control configuration information further comprises at least one of the following information:
information about power control for sending the first message; and
information about rate control for sending the first message.

11. The non-transitory computer-readable medium according to claim 10, wherein the network congestion control information comprises information about power control for sending the first message, and the information about the power control for sending the first message comprises a maximum transmit power for sending the first message.

12. The non-transitory computer-readable medium according to claim 10, wherein the network congestion control information comprises information about rate control for sending the first message, and the information about the rate control for sending the first message comprises information about a highest rate of sending the first message.

* * * * *